(12) United States Patent
Kalb et al.

(10) Patent No.: US 11,286,356 B2
(45) Date of Patent: *Mar. 29, 2022

(54) METHOD FOR FUSING ARAMID/ARAMID FIBRES

(71) Applicant: PROIONIC GMBH, Grambach (AT)

(72) Inventors: Roland Kalb, Sinabelkirchen (AT); Burghardt Schmidt, Dornach (CH)

(73) Assignee: PROIONIC GMBH, Grambach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,509

(22) Filed: May 13, 2020

(65) Prior Publication Data

US 2020/0270405 A1 Aug. 27, 2020

Related U.S. Application Data

(63) Continuation of application No. 15/126,123, filed as application No. PCT/EP2015/058337 on Apr. 16, 2015, now Pat. No. 10,723,849.

(30) Foreign Application Priority Data

Apr. 16, 2014 (EP) ..................................... 14164901

(51) Int. Cl.
*C08J 5/12* (2006.01)
*C08J 3/11* (2006.01)
(Continued)

(52) U.S. Cl.
CPC ................. *C08J 5/122* (2013.01); *C08J 3/11* (2013.01); *C08J 5/046* (2013.01); *C08L 77/10* (2013.01); *D01F 6/605* (2013.01); *D06M 13/00* (2013.01); *D06M 13/292* (2013.01); *D06M 13/463* (2013.01); *D06M 13/473* (2013.01);
(Continued)

(58) Field of Classification Search
CPC . C08J 5/122; C08J 2377/10; C08J 3/11; C08J 5/046; D06M 2101/36; D06M 3/10; D06M 13/00; D06M 13/292; D06M 13/463; D06M 13/473; C08L 77/10; D01F 6/605; D10B 2331/021
See application file for complete search history.

(56) References Cited

U.S. PATENT DOCUMENTS 5,357,031 A 10/1994 Miess
8,202,379 B1 6/2012 Delong et al.
(Continued)

FOREIGN PATENT DOCUMENTS

CN 101538747 9/2009
CN 102448573 5/2012
(Continued)

OTHER PUBLICATIONS

Search Report issued in 2016140231 dated Oct. 25, 2018.
(Continued)

*Primary Examiner* — Shane Fang
(74) *Attorney, Agent, or Firm* — Workman Nydegger

(57) ABSTRACT

A method for fusing aramid fibers, wherein a) at least one area of an aramid fiber is treated with an ionic liquid so that the aramid is partially dissolved, b) the aramid fiber is contacted via the dissolved area with another aramid fiber area with pressure being applied to the contact area, and subsequently c) the partially dissolved area of the aramid is re-coagulated.

19 Claims, 1 Drawing Sheet

(51) Int. Cl.
| | |
|---|---|
| D06M 13/00 | (2006.01) |
| D06M 23/10 | (2006.01) |
| C08J 5/04 | (2006.01) |
| C08L 77/10 | (2006.01) |
| D01F 6/60 | (2006.01) |
| D06M 13/292 | (2006.01) |
| D06M 13/463 | (2006.01) |
| D06M 13/473 | (2006.01) |
| D06M 101/36 | (2006.01) |

(52) U.S. Cl.
CPC .......... *D06M 23/10* (2013.01); *C08J 2377/10* (2013.01); *D06M 2101/36* (2013.01); *D10B 2331/021* (2013.01)

(56) References Cited

U.S. PATENT DOCUMENTS

| | | |
|---|---|---|
| 8,203,379 B2 | 6/2012 | DeLong et al. |
| 2002/0121720 A1 | 9/2002 | Davies |
| 2004/0242099 A1 | 12/2004 | Yoshimoto et al. |
| 2005/0288484 A1 | 12/2005 | Holbrey et al. |
| 2006/0269695 A1 | 11/2006 | Daly et al. |
| 2010/0029159 A1 | 2/2010 | Ishihara et al. |
| 2011/0250162 A1 | 10/2011 | Broughton et al. |
| 2012/0116096 A1 | 5/2012 | Kalb |
| 2017/0183460 A1 | 6/2017 | Kalb et al. |

FOREIGN PATENT DOCUMENTS

| | | |
|---|---|---|
| DE | 19716057 | 10/1998 |
| EA | 15898 B1 | 6/1998 |
| EP | 578164 A | 1/1994 |
| EP | 1482086 | 5/2006 |
| KR | 20100048113 | 5/2010 |
| RU | 2452799 C2 | 6/2012 |
| SU | 246836 A1 | 6/1996 |
| WO | WO2009027250 | 8/2009 |
| WO | WO2009101032 | 8/2009 |
| WO | WO2008075751 | 4/2010 |
| WO | WO2011004138 | 1/2011 |

OTHER PUBLICATIONS

International Search Report cited in PCT Application U.S. Appl. No. PCT/EP2015/058337 dated Jul. 14, 2015.

Haverhals et al., "Natural Fiber Welding: Ionic Liquid Facilitated Biopolymer Mobilization and Reorganization", Ionic Liquids: Science and Applications; [ACS Symposium Series, vol. 1117], 20121218 American Chemical Society, URL: http://pubs.acs.org/doi/pdf/10.1021/bk-2012-1117.ch006.

Broughton et al., "Investigation of Organic Liquids for Fiber Extrusion", National Textile Center Annual Report: Oct. 2009.

Freemantle, "Eyes on Ionic Liquids", May 15, 2000, C&EN.

Kamlet et al., "The solvatochromic comparison method. I. The $\beta$-scale of solvent hydrogen-bond acceptor (HBA) basicities", Journal of the American Chemical Society (1976), 98(2), 377-83.

Kamlet et al., "The solvatochromic comparison method. 6. The $\pi^*$ scale of solvent polarities", Journal of the American Chemical Society (1977), 99(18), 6027-38.

Kamlet et al., "Linear solvation energy relationships. 6. Additions to and correlations with the $\pi^*$ scale of solvent polarities", Journal of Organic Chemistry (1979), 44(15), 2599-604.

Kamlet et al., "Linear Solvation Energy Relationships", J. Org. Chem., 1983, 48, 2877-2887.

Lee et al., "Antimicrobial Polymeric Materials; Cellulose and m-Aramid Composite Fibers", Journal of Engineered Fibers and Fabrics, vol. 2, Issue 4, 2007.

Lozinskaya et al., "Direct polycondensation of ionic liquids", European Polymer Journal, 40 (2004), 2065-2075.

Reichardt, "Solvents and Solvent Effects in Organic Chemistry", Third Edition, 2003 Wiley-VCH Verlag GmbH & Co. KGaA.

Spange et al., "Correlation of molecular structure and polarity of ionic liquids", Journal of Molecular Liquids 192 (2014) 137-143.

Suter Kunststoffe: Aramidfasern (Kevlar).

Taft et al., "The solvatochromic comparison method. 2. The $\alpha$-scale of solvent hydrogen-bond donor (HBD) acidities", Journal of the American Chemical Society (1976), 98(10), 2886-94.

Vygodskii et al., "Ionic Liquids as Novel Reaction Media for the Synthesis of Condensation Polymers", Macromol. Rapid Commun. 2002, 23, 676-680.

Wasserscheid et al., "Ionic LIquids in Synthesis", Second Edition, 2008 Wiley-VCH Verlag GmbH & Co. KGaA.

Rogers et al, "Ionic Liquids—Industrial Applications to Green Chemistry", ACS Symposium Series 818, 2002.

U.S. Appl. No. 15/126,123, Oct. 26, 2018, Office Action.
U.S. Appl. No. 15/126,123, Feb. 12, 2019, Final Office Action.
U.S. Appl. No. 15/126,123, Jun. 13, 2019, Office Action.
U.S. Appl. No. 15/126,123, Oct. 11, 2019, Final Office Action.
U.S. Appl. No. 15/126,123, Mar. 20, 2020, Notice of Allowance.
U.S. Appl. No. 15/126,123, May 8, 2020, Corrected Notice of Allowability.

Holbrey, J.D., et al., "Ionic Liquids", Clean Products and Processes 1 (1999); Received May 14, 1999/ Accepted Jul. 10, 1999.

METHOD FOR FUSING ARAMID/ARAMID FIBRES

CROSS REFERENCE TO RELATED APPLICATIONS

This Application is a continuation of U.S. patent application Ser. No. 15/126,123, filed Sep. 14, 2016, which is a 371 Application of International Patent Application No. PCT/EP2015/058337, filed Apr. 16, 2015, which claims the benefit of European Patent Application No. 14164901.2, filed Apr. 16, 2014, the disclosures of which are incorporated herein by reference in their entirety.

BACKGROUND

The present invention relates to a method for fusing aramid/aramid fibers, fused aramid fibers as well as shaped articles made of fused aramid fibers.

According to the US-American Federal Trade Commission and DIN 60001 aramids (aromatic polyamides, polyaramids) are long-chain synthetic polyamides in which at least 85% of the amide groups are attached directly to two aromatic rings. Two aramid polymers may be linked via hydrogen bonds and e.g. have the following structural characteristics:

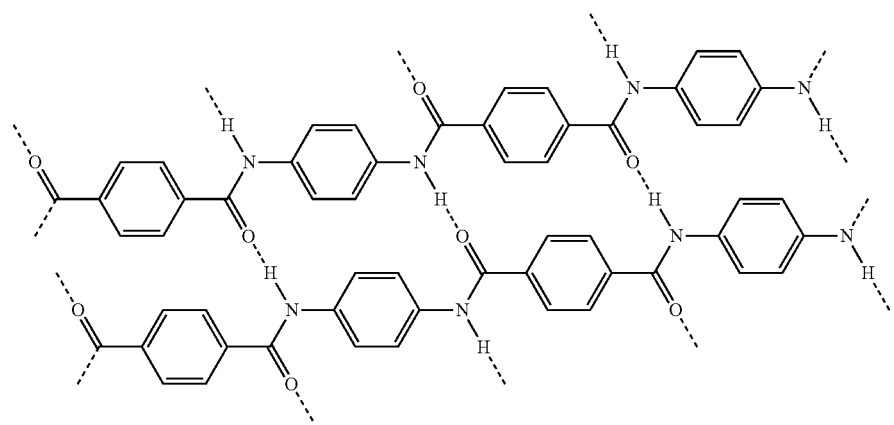

Para-aramid

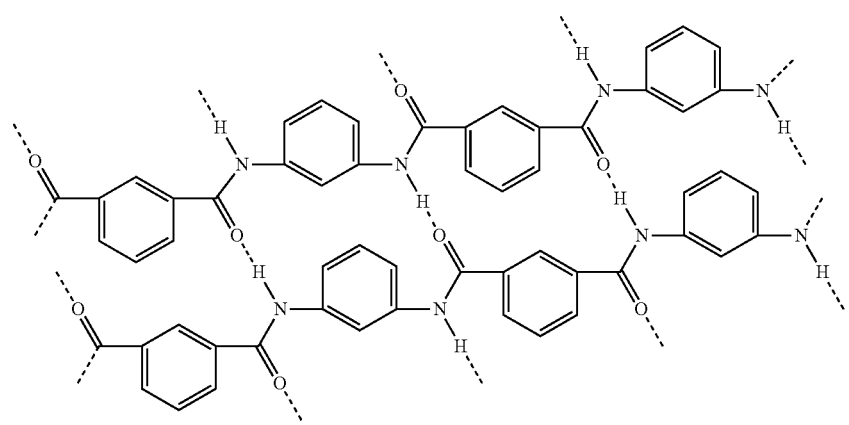

Meta-aramid

Aramid is mainly produced as fiber and less frequently as sheet or film. Aramid fibers are golden-yellow organic synthetic fibers. The fibers were developed in 1965 by Stephanie Kwolek at DuPont and brought to market maturity under the trade name Kevlar®. Aramid fibers are characterized by very high strength, high impact resistance, high elongation at break, good vibration absorption and resistance to acids and bases. In addition, they are highly heat and fire resistant. Aramid fibers do not melt at high temperatures, but start to carbonize from approximately 400° C.

Well-known trade names of aramid fibers are Nomex® and Kevlar® from DuPont or Teijinconex®, Twaron® and Technora® from Teijin. There are meta-aramids (Nomex® and Teijinconex®), para-aramids (Twaron® and Kevlar®) and para-aramid copolymers (Technora®).

Para-aramids are also referred to as poly-p-phenylene terephthalamide (PPTA), meta-aramids as poly-m-phenylene isophthalamides (PMIA); further chemical structures and trade names are available under the CAS numbers 308082-87-3, 308069-66-1, 308069-57-0, 308069-56-9, 89107-41-5, 63428-84-2, and 24938-60-1.

The para-aramid copolymer Technora® is a copolyterephthalamide with paraphenylene diamine and 4,4'-diaminodiphenyl ether. It has e.g. the following structural characteristics:

-continued

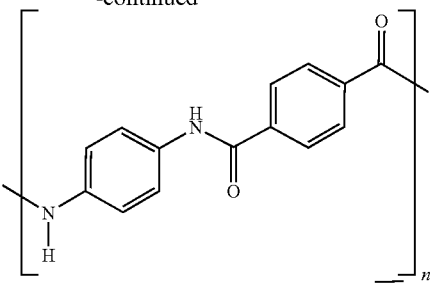

The polymer is formed by reacting the two monomers in a solvent. A possible solvent is hexamethylphosphoric triamide, which should, however, be avoided because of its carcinogenic effects. This may be achieved, for example, by conducting the polymerization in a slurry of excessive $CaCl_2$ in the solvent N-methylpyrrolidone.

Processing of aramid into fibers is in general carried out from solutions because the approach of direct spinning from a polymer solution has proven to be impractical and because the melting point is usually far above the thermal decomposition point. In this context, a high polymer concentration

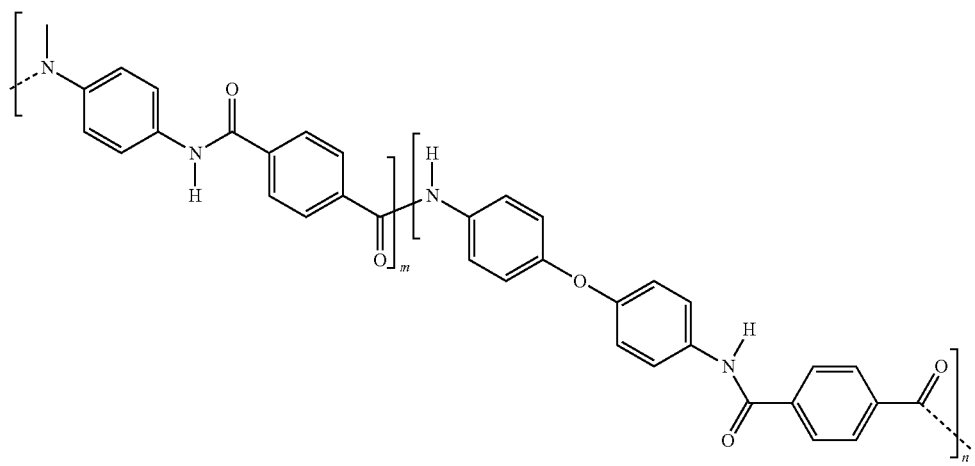

Production of aramids is in general based on halides of aromatic dicarboxylic acid and aromatic diamines, such as para-phenylene diamine (PPD) and terephthaloyl dichloride (TDC):

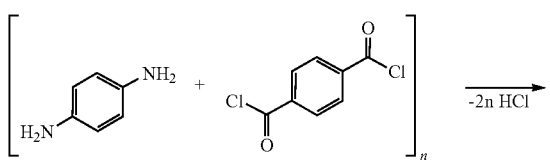

in the spinning solution is advantageous for filament production and may result in high orientations.

Concentrated sulfuric acid is a good solvent for aramids in high concentrations and anisotropic in nature. Possible ways for producing aramid fibers via polymerization and the use of sulfuric acid as solvent or for direct spinning are known (Aramidprozess, Melliand Textilberichte 1982, by Blumberg/Hillermeier). The spinning process may be a standard classical wet-spinning process. The use of an air gap between the spinneret and the spinning bath, as is e.g. known from acrylic spinning, has advantages. After drying, the yarn usually has high strength and a high elastic modulus. In a second process stage, the yarn may be stretched, e.g.

at temperatures of 300-400° C. This further increases the modulus at the same strength and reduced elongation at break.

In addition, ionic liquids as solvents for aramids, e.g. during synthesis (e.g. WO 2011/004138 A1, WO 2009/101032 A1) as well as for spinning composite fibers (US 2011/250162 A1) have been described in the state of the art. This is advantageous because polyaramids are soluble in almost no other solvent, except for concentrated sulfuric acid (highly corrosive and carbonizing), hexamethylphosphoric triamide (strongly carcinogenic) or suspensions of calcium chloride in N-methylpyrrolidone (toxic, teratogenic, difficult to handle). Other high-polar solvents such as DMSO and DMF can only swell, but not dissolve aramid polymers.

Similar to carbon fibers, the fibers have a negative thermal expansion coefficient in the direction of the fiber, i.e. become shorter and thicker upon heating. Their specific strength and their elastic modulus are considerably lower than those of carbon fibers. In connection with the positive coefficient of expansion of the matrix resin, components with high dimensional stability may be produced. Compared to carbon fiber-reinforced plastics, the compressive strength of aramid fiber composite materials is considerably lower; impact resistance, on the other hand, substantially higher. Aramids have extremely high stability against heat, they easily endure temperatures above 370° C. without melting and are highly resistant to heat.

There are two different modifications that differ in particular with regard to the elastic modulus: "low modulus" (LM) and "high modulus" (HM).

Typical characteristics of aramid fibers are summarized in the following

TABLE 1

|  | Low Modulus (LM) | High modulus (HM) |
|---|---|---|
| Density in $g \cdot cm^{-3}$ at 20° C. | 1.44 | 1.45 |
| Filament diameter in μm | ≈12 | ≈12 |
| Tensile strength in MPa ($N \cdot mm^{-2}$) | 2800 | 2900 |
| Tensile modulus of elasticity in GPa | 59 | 127 |
| Elongation at break in % | 4 | 1.9 |
| Therm. expansion coefficient in $10^{-10} \cdot K^{-1}$ | −2.3 | −4.1 |
| Thermal conductivity in $W \cdot m^{-1} \cdot K^{-1}$ | 0.04 | 0.04 |
| Decomposition temperature in ° C. | 550 | 550 |

The data in Table 1 are taken from "Suter Kunststoffe: Aramidfasern (Kevlar) http://www.swiss-composite.ch/pdf/I-Aramid.pdf."

The high modulus fibers are mainly used for structural elements subjected to impact and shock stress, low modulus fibers for a variety of uses, e.g. in bullet-resistant vests.

Aramid sheets are often calendered from fabrics, but also produced directly as thin sheets or films. They are often used as insulating materials, e.g. in transformers of insulation class C for temperatures up to 220° C., as base material for flexible printed circuit boards and as window materials for accelerators and detectors. Nomex® fibers are, for example, used in the AgustaWestland AW101 helicopter as composite material for covering close to turbine outlets and as textile in hot air balloons for the scoop and the lowest part of the envelope.

The most well-known uses of aramid fibers, e.g. para-aramid fibers, are in the security field (splinter and bullet protective vests, protective helmets, armoring for vehicles, cut resistant gloves, heat protective clothing). Aramid fibers are also used as replacement for asbestos in brake and clutch linings and as sealing and reinforcement material, e.g. for fiber optic cables or rubber materials (tires). Another field of application of aramid papers additionally is electric insulation. The products may be used as sliding cover, groove insulation and phase insulation in electric motors as well as layer insulation in transformers. Aramid fabrics are also used for roofings in the building industry, e.g. for stadium roofings. Here, they form a base material that is covered with PVC or PTFE to provide a UV and weather resistant, partially transparent membrane. Because of their toughness and tensile strength as well as their low mass, aramid fibers are also often used for sports equipment, e.g. accessory cords, cords for paragliders, sails for sailboats and surf boards, hockey sticks or tennis rackets. Certain bicycle tires provide protection from broken pieces of glass and similar objects by means of aramid inlays. Foldable tires often comprise a Kevlar yarn instead of a wire.

In addition, aramid fibers or composite materials based on aramid fibers may be used in aerospace applications, e.g. airplane cabin floors and interiors, landing gear doors, wings, wing boxes and control surfaces, for pressure cylinders (e.g. oxygen pressure cylinders), for engine nacelles and engine safety rings, in airplane tires, in rotor blades, in cable harnesses and air fright containers. Almost all modern jet engines comprise aramid fabrics in the engine cowling in order to contain debris within the engine in case of blade-off events. The new Boeing 787 "Dreamliner", for example, consists of 50% by weight and 80% by volume of fiber-reinforced high-tech composite materials, a substantial part of which is made of aramid-based sandwich honeycomb cores.

In manned and unmanned space flight, aramid fibers are mainly used for protection against flying space debris. In seagoing vessels, aramid is used for partition walls and other interior structures.

Aramid fibers are also used as reinforcing material in so-called "textile-reinforced concrete."

In the automotive field, aramid fibers are e.g. used in tires, brake hoses, as vehicle protection, in brake linings, drive belts, automatic transmissions, fuel hoses, air-suspension bellows, cooling systems, turbochargers and sealing.

In the field of petroleum and natural gas production, aramid fibers are used for reinforcing pipes and pipelines as wells as for the protection of supply lines, cables, risers, ropes and belts.

In telecommunications, aramid fibers are used for high-end optical transmission of data—as a further development of fiber optic cables.

Meta-aramid fibers are used specifically for fire protection. They became known in fire-resistant clothing (e.g. protective clothing for firefighters, race car driver suits etc.).

Membranes of modern high-performance speakers also often comprise aramid fibers.

In addition, aramid fibers are used as invisible threads by magicians under the name of "invisible Kevlar thread."

During handling and processing, its high moisture absorption and low UV resistance have to be taken into account. The originally golden-yellow fibers take on a bronze-brown color upon UV radiation (sunlight) and lose up to 75% of their strength. Depending on storage, the fibers can absorb up to 7% of water. Fibers containing too much humidity may be dried. In aerospace applications, a water content below 3% is common. Special micro-toothed cutting tools are required for cutting aramid fibers. Mechanical processing of finished fiber composite components is also possible with high-quality processing tools or by water-jet cutting. Fiber composite parts are usually produced with epoxy resins. Chemical coupling agents are not known.

The state of the art shows that polyaramid fibers and sheets offer a variety of great technical advantages, such as high tear resistance and high thermal resistance, but also have some disadvantages, such as:

aramid fibers cannot be recycled (except for cases in which the above problematic solvents are used);

there is no chemical coupling agent;

aramid fibers may be glued, but not be fused (thermal decomposition point lower than melting point).

These disadvantages in handling aramid fibers or sheets result in a problem with regard to shaped articles made of multiple aramid units, i.e. the joints between aramid units cannot show the same material properties as aramid.

For example, aramids may be used as inlay in tension members of conveyor belts or conveyor facilities due to their tear resistance. Since ring closure of the belt has to occur via a mechanical or bonded connection of the aramid units, there is a weak point with regard to tear resistance. In general, joining aramid units may be regarded as problematic, so that aramid fibers are often integrated with other supporting and connecting materials, which results in increased material expenditure and higher weight of shaped bodies, which leads to further disadvantages, e.g. in aircraft manufacturing.

Arrangement of fibers in fabrics results in a good, mostly tear-proof connection. Aramid fabrics have a bullet-resistant effect, however, do not provide stab protection because the blade of a knife may penetrate between individual fibers.

SUMMARY

Surprisingly, a method was now found for fusing aramid which allows overcoming the described disadvantages of the state of the art. The method for fusing aramid fibers is characterized in that a) at least one area of an aramid fiber is treated with an ionic liquid so that the aramid is partially dissolved, b) the aramid fiber is contacted at the partially dissolved area with another aramid fiber area preferably while pressure is applied to the contact area, wherein preferably the other aramid fiber area has also been partially dissolved according to step a), and subsequently c) the partially dissolved area of the aramid is re-coagulated.

DETAILED DESCRIPTION

Figure 1:
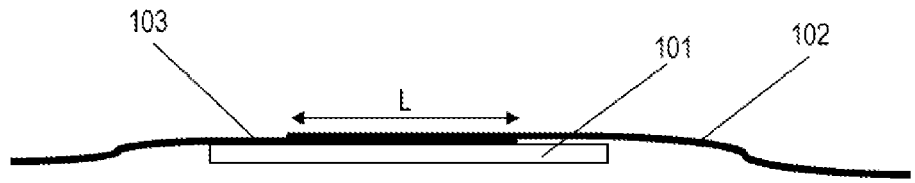
FIG. 1 shows a cross-section of a setup for fusing a first aramid fiber 102 and a second aramid fiber 103 on an object slide 101, the fibers overlapping in an area with a length L.

"Aramid" according to the present invention includes meta-aramid, para-aramid and para-aramid copolymers.

As used herein, the term "aramid fibers" is intended to also include aramid sheets and films, aramid fabrics, aramid parts, aramid coatings, e.g. lacquers, in addition to aramid fibers. According to the inventive method several fibers may be fused together or single aramid fibers may be fused with themselves. For example, the method may be used to connect a single aramid fiber at its ends in order to provide an aramid fiber ring. Here, on end represents the partly dissolved area and the other end represents the other aramid fiber area. The aramid fiber area may also extend over the entire aramid fiber or sheet.

Ionic liquids are—in the sense of acknowledged literature (e.g. Wasserscheid, Peter; Welton, Tom (Eds.); "Ionic Liquids in Synthesis, $2^{nd}$ Edition," Wiley-VCH 2008; ISBN 978-3-527-31239-9; Rogers, Robin D.; Seddon, Kenneth R. (Eds.); "Ionic Liquids—Industrial Applications to Green Chemistry," ACS Symposium Series 818, 2002; ISBN 0841237891)—liquid organic salts or salt mixtures consisting of organic cations and organic or inorganic anions with melting points below 100° C. Additional inorganic salts may be dissolved in these salts, as well as molecular adjuvants. For the purposes of the present application, we regard the melting point limit of ionic liquids arbitrarily set at 100° C. in a wider sense and also include salt melts having a melting point above 100° C., but below 200° C. Ionic liquids have very interesting properties, such as in general very low to non-measurable vapor pressures, very wide liquidus ranges, good electric conductivity, and unusual solvation properties. These properties predestine it for the use in various fields of technical uses. For example, ionic liquids are also known for fusing natural fibers (Haverhals, L. M.; Foley, M. P.; Brown, E. K.; Fox, D. M.; De Long, H. C.; In Ionic Liquids; Science and Applications; 2012). As shown in Table 1 in Haverhals et al., the properties of aramids are in many aspects more similar to those of steel than natural fibers. It was thus not to be expected that this use of ionic liquids was transferrable to aramids because these synthetic materials differ from natural fibers such as cellulose in their structure, constitution and dissolving behavior.

When using ionic liquids, optimizing the properties for the respective use within wide limits can be achieved by varying the anion and cation structures or their combination, which is why ionic liquids are generally called "designer solvents" (see, for example, Freemantle, M.; Chem. Eng. News, 78, 2000, 37).

Suitable ionic liquids for the inventive method are selected so that the aramid is partially dissolved. Here, "partially dissolving" means that the structure is not completely dissolved, but contact or interaction between individual aramid polymer chains is loosened or broken up. Dissolve partially, however, also means that a part of the structure of the aramid unit remains intact. For example, the core of an aramid fiber may remain unchanged, while the surface area is dissolved in the course of the method. Gelling aramid fibers is also regarded as partially dissolved according to the invention because the main shape and the unity as a fiber are maintained. Completely dissolving aramid fibers, i.e. dissolving them with the loss of the entire unit, is not comprised in the term of dissolve partially.

The inventive method is based on the finding of the present invention that an appropriate selection of the cation, the anion and optional additives provides ionic liquids that are suitable to partially dissolve aramids according to the present invention. Such ionic liquids are also referred to as "ionic liquid(s) according to the present invention" herein.

It is to be expected that the interaction forces between individual polymer chains of a fiber are partially disrupted during these methods because the ionic liquid penetrates between the chains. The physical proximity of the fibers in step b) of the method allows polymer chains of different fibers to get into contact with each other. Subsequently, the interaction between polymer chains may be restored, for example, by removing the ionic liquid. Because of the arrangement created, the fibers coagulate so that the polymer chains of the originally separated fibers start interacting. In the course of step c), the material properties of the aramids are at least partially restored and the fit and form closure desired for fusing is achieved between the individual aramid fibers.

While steps a) and b) of the method may be carried out in the order a) followed by b) or in combination or in reversed order, step c) is effectively carried out subsequently to the other steps. Steps a) and b) may, for example, be combined so that the aramid fibers are first contacted and form a fabric, which is then treated with the ionic liquid as a fabric. It may be advantageous to repeat individual steps.

Advantageously, the inventive method thus provides an uncomplicated fusing method and allows "reshaping" of aramid fibers by partial dissolution, connection and re-precipitation. Coagulation of the dissolved aramid may be carried out by adding appropriate anti-solvents as liquid- or vapor-phase or by absorption of air humidity because in particular suitable ionic liquids may be strongly hygroscopic. Alternatively, the ionic liquid may be removed by heating. Depending on the temperature during heating, there are two mechanisms for removing the ionic liquid: a) heating to above its thermal decomposition point in order to convert it to gaseous decomposition products, optionally under application of vacuum, or b) heating to below its thermal decomposition point, as long as the ionic liquid has a vapor pressure high enough to allow distilling it off, optionally in vacuum. "Reshaping" also comprises shaping three-dimensional parts and structured fabrics, for example a two-dimensional aramid fabric/textile may be sprayed with an ionic liquid and be pressed into a three-dimensional shape under heat and/or anti-solvents.

Ionic liquids according to the present invention have the general formula:

wherein
a is a number of 1, 2 or 3,
$[A]^+$ is an organic cation, and
$[B]a^-$ is an anion.

In a compound of Formula I of the present invention, $[B]^{a-}$ refers to any coordinating anion with a negative charge a that is in line with the number of existing cations a in $[A]_a^+$.

Here, a in $[B]^{a-}$ refers to a number of 1, 2 or 3. An example of double-negatively charged anions is carbonate. An example of a triple-negatively charged anion is phosphate.

As used in the present patent application, suitable ionic liquids refer to "coordinating" ionic liquids. A "coordinating" ionic liquid, as used in the present patent application, is one that contains coordinating anions. Coordinating anions are characterized in that they comprise free electron pairs that are able to form coordinative bonds with electron pair acceptors (Lewis acids) or proton donors (Bronstedt acids). In the case of proton donors, the protons are covalently bonded to an atom that is electronegative towards the proton (e.g. O, N, F), so that the bond is polar ("acidic protons"), however, the proton is not cleaved off but forms a second, coordinative bond with the coordinating anion of the ionic liquid (hydrogen bond). Particularly good coordinating anions are only present when the free electron pairs sit on small heteroatoms with high charge densities. This is especially the case with anions containing oxygen atoms, in particular alkyl oxides, aryl oxides, hydroxide, or carboxylate, or with fluoride, chloride and bromide.

As used in the present document, the term "coordinating ionic liquid" comprises, in addition to coordinating ionic liquids, also mixtures of different coordinating ionic liquids as well as mixtures of coordinating ionic liquids with co-solvents or anti-solvents, so that e.g. in addition to the solvents of groups II and I, as described in Example 3 of the present application, non-coordinating ionic liquids may also be added as co- or anti-solvents.

In addition, it was shown that it is preferred for cations to be present as "quaternary" compounds. As used in the present application, "quaternary" means that all valences of a nitrogen or phosphorus atom are stably and organically bound so that no more lone, non-binding electron pairs exist. This applies to fourfold alkylated ammonium or phosphonium salts as well as to nitrogens integrated into aromatics (heteroaromatics) with a third substituent, which is not hydrogen, e.g. pyridinium salts. Decisive for suitability in the invention is the property of a constant positive charge. This property is also provided by protonated guanidinium because the hydrogen has such a low acidity that a constant positive charge is also guaranteed here. For guanidine, a $pK_a$ value in water of 13.6 to 13.7 is given. Substituted guanidine derivatives may be even more basic, with $pK_a$ values above 14, which may be determined in non-aqueous media, or less basic, e.g. $pK_a\sim10$ for phenyl guanidine, via the electron acceptor residue. The invention includes protonated cations with a $pK_a$ value$\geq10$, preferably $\geq13$. It is a finding of the present application that ionic liquids with deprotonable cations are not suitable for dissolving or partially dissolving. In Example 2, the Comparative Examples No. 22-23 have acidic hydrogens and support this finding.

It may also be deducted from Example 2 that the size of the cation has an impact on whether an ionic liquid dissolves aramids completely or gels/partially dissolves them. This may be controlled, for example, via a suitable side-chain length of the alkyl residues. While a 1-butyl-3-methylimidazolium chloride in Example 3 completely dissolves the aramid fiber, it is only gelled by 1-decyl-3-methylimidazolium chloride in Example 12. It is assumed that the smaller, flexible cations enable the cation to penetrate between the individual polymer chains. The requirement of a cation to penetrate deeply might be explained by the fact that in addition to hydrogen bonds, aromatic interactions might also play a role between the aramid chains. The presence of positive charges between the chains may replace the purely aromatic interactions with cation-aromatic interactions and thus lead to a complete dissolution. Ionic liquids, the cations of which are not able to penetrate between the polymer chains that easily because they are bigger or bulkier, seem to promote gelling or partial dissolution. A person skilled in the art can appropriately choose the size of the cations based on the examples disclosed herein.

In order to identify suitable ionic liquids for dissolving or partially dissolving, Kamlet-Taft solvent parameters may be used. The Kamlet-Taft solvent parameters describe the hydrogen bond donor property ($\alpha$), the hydrogen bond acceptor property ($\beta$) and the bipolarity/polarizability ($\pi^*$) of the solvent ("Solvents and Solvent Effects in Organic Chemistry"; Christian Reichardt, WILEY-VCH, Weinheim 2003, ISBN 3-527-30618-8; Kamlet, M. J.; Abboud, J. L.; Taft, R. W. J. Am. Chem. Soc. 1977, 99, 6027; Kamlet, M. J.; Taft, R. W. J. Am. Chem. Soc. 1976, 98, 377; Kamlet, M. J.; Hall, T. N.; Boykin, J.; Taft, R. W. J. Org. Chem. 1979, 44, 2599; Taft, R. W.; Kamlet, M. J. J. Am. Chem. Soc. 1976, 98, 2886). They may be measured by means of a so-called solvatochromic shift and are well-known to the person skilled in the art. It has been shown that ionic liquids with high $\beta$ values, i.e. with good properties as hydrogen bond acceptor, and low a values, i.e. poor capacity as hydrogen bond donor, are particularly well suited. The following table shows several parameters from the literature, wherein multiple entries result from contradictory literature references:

TABLE 2

| No. | Ionic liquid[X] | CAS No. | α | β | Π* | β-α |
|---|---|---|---|---|---|---|
| 1 | 1-Ethyl-3-methylimidazolium acetate[2] | 143314-17-4 | 0.57 | 1.06 | 0.97 | 0.49 |
| 2 | 1-Octyl-3-methylimidazolium chloride[1] | 64697-40-1 | 0.31 | 0.98 | 1.03 | 0.67 |
| 3 | 1-Decyl-3-methylimidazolium chloride[1] | 171058-18-7 | 0.31 | 0.98 | 0.97 | 0.67 |
| 4 | 1-Butyl-3-methylimidazolium chloride[1] | 79917-90-1 | 0.32 | 0.95 | 1.13 | 0.63 |
| 5 | 1-Butyl-3-methylimidazolium acetate[1] | 284049-75-8 | 0.36 | 0.85 | 1.06 | 0.49 |
|   | 1-Butyl-3-methylimidazolium acetate[2] | 284049-75-8 | 0.57 | 1.18 | 0.89 | 0.61 |
| 6 | 1-Hexyl-3-methylimidazolium chloride[2] | 171058-17-6 | 0.48 | 0.94 | 1.02 | 0.46 |
| 7 | 1-Butyl-3-methylimidazolium nitrate[1] | 179075-88-8 | 0.4 | 0.74 | 1.04 | 0.34 |
| 8 | 1-Butyl-3-methylimidazolium tetrafluoroborate[1] | 174501-65-6 | 0.52 | 0.55 | 0.96 | 0.03 |
|   | 1-Butyl-3-methylimidazolium tetrafluoroborate[2] |  | 0.77 | 0.39 | 1.04 | 0.38 |
| 9 | 1-Butyl-3-methylimidazolium methane sulfonate[2] | 342789-81-5 | 0.44 | 0.77 | 1.02 | 0.33 |
|   | 1-Butyl-3-methylimidazolium methanesulfonate[1] |  | 0.36 | 0.85 | 1.04 | 0.49 |
| 10 | 1-Butyl-3-methylimidazolium methyl sulfate[1] | 401788-98-5 | 0.39 | 0.75 | 1.05 | 0.36 |
|   | 1-Butyl-3-methylimidazolium methyl sulfate[2] |  | 0.53 | 0.66 | 1.06 | 0.13 |
| 11 | 1-Butyl-3-methylimidazolium trifluoromethanesulfonate[3] | 174899-66-2 | 0.60 | 0.50 | 1.00 | −0.10 |
| 12 | 1-(2-Hydroxyethyl)-3-methylimidazolium acetate[4] | 1203809-91-9 | 0.53 | 0.90 | 1.04 | 0.37 |
| 13 | 1-Butyl-3-methylimidazolium butyrate[2] | 669772-78-5 | 0.51 | 1.23 | 0.92 | 0.72 |
| 14 | 1-Butyl-3-methylimidazolium propionate[2] | 914497-10-2 | 0.48 | 1.16 | 0.94 | 0.68 |
| 15 | 1-Ethyl-3-methylimidazolium nitrate[4] | 143314-14-1 | 0.48 | 0.66 | 1.13 | 0.18 |

[X] References:
[1] A. Schade; J. Molec. Liqu., 2014, 192, 137-143
[2] R. Wilding; Phys. Chem. Phys., 2011, 13, 16831-16840
[3] Electronic Supplementary Material (ESI) for Physical Chemistry Physics, The Owner Societies 2011
[4] Shiguo Zhang, Xiujuan Qi, Xiangyuan Ma, Liujin Lu and Youquan Deng; J. Phys. Chem. B 2010, 114, 3912-3920

The ionic liquids No. 1 to No. 6 of Table 2 are suitable for dissolving meta-aramid fibers and para-aramid copolymer fibers (see Example 2). They have β values above 0.8 and α values lower below 0.6. Generally, ionic liquids with β values above 0.6, preferably above 0.7, more preferably above 0.8, may be suitable for the inventive methods. In particular, the difference of β value minus α value is high in suitable ionic liquids. This difference "β-α" describes the free, available hydrogen bond acceptor capacity. Preferred ionic liquids have a difference value "β-α"≥0.3, more preferably ≥0.45. The ionic liquids No. 7 and No. 8 from Table 2 each have a higher α value, lower β value or lower β-α value. In Example 2, these ionic liquids were not able to partially dissolve aramid fibers. No. 9 to No. 15 from Table 2 were not used in the Examples in this way and are included for comparison. With No. 9 it is to be expected that the strikingly high β value from literature reference 1 (A. Schade, J. Molec. Liqu., 2014, 192, 137-143) might be a measuring error.

In one aspect, the inventive method is characterized in that the ionic liquid meets at least one of the following two criteria:
  i) α value<0.6 and β value>0.8;
  ii) difference of β value minus α value≥0.45,
wherein the α value and β value are Kamlet-Taft solvent parameters.

In one aspect, the method is characterized in that the aramid fibers are selected from the group comprising meta-aramid and para-aramid copolymers.

It has been shown that meta-aramid and para-aramid copolymer fibers, such as Nomex or Technora, may be dissolved or partially dissolved by a greater variety of suitable ionic liquids, while for para-aramid fibers like Kevlar, the selection of suitable ionic liquids is more limited. The present disclosure and the examples below provide sufficient information and rules for a person skilled in the art to select a suitable ionic liquid for the respective type of aramid fiber.

In a further aspect, the method for fusing aramid fibers of the group comprising meta-aramid and para-aramid copolymers is characterized in that the ionic liquid comprises a salt,
  the cation being selected from a quaternary ammonium, phosphonium, guanidinium, pyridinium, pyrimidinium, pyridazinium, pyrazinium, piperidinium, morpholinium, piperazinium, pyrrolium, pyrrolidinium, oxazolium, thiazolium, triazinium, imidazolium, triazolium, protonated guanidinium, and the anion being selected from
  halide, selected from the group comprising F⁻, Cl⁻, Br⁻
  carboxylate of the general formula

$$[R_n-COO]^- \quad \quad (Vd)$$

wherein $R_n$ represents hydrogen, $(C_{1-10})$alkyl, $(C_{3-10})$cycloalkyl, $(C_{2-10})$alkenyl, $(C_{3-10})$cycloalkenyl, aryl, or heteroaryl, preferably $(C_{1-8})$alkyl, $(C_{3-8})$cycloalkyl, $(C_{2-8})$alkenyl, $(C_{3-8})$cycloalkenyl, 5- to 6-membered aryl, or 5- to 6-membered heteroaryl, carbonate,
  alkylcarbonate of the general formula

$$[R_s-OCOO]^- \quad \quad (Vf)$$

wherein $R_s$ is $(C_{1-4})$alkyl, in particular methyl carbonate and ethyl carbonate hydroxide,
  alkoxide or aryloxide of the general formula

$$[R_m-O]^- \quad \quad (Ve)$$

wherein $R_m$ represents $(C_{1-10})$alkyl, $(C_{3-10})$cycloalkyl, $(C_{2-10})$alkenyl, $(C_{3-10})$cycloalkenyl, aryl, or heteroaryl, preferably $(C_{1-8})$alkyl, $(C_{3-8})$cycloalkyl, $(C_{2-8})$alkenyl, $(C_{3-8})$cycloalkenyl, 5- to 6-membered aryl, or 5- to 6-membered heteroaryl, phosphate $PO_4^{3-}$, alkyl or dialkyl phosphate, or alkyl- and dialkyl phosphonate of the general formulas

$$[R_u\text{—}OPO_3]^{2-} \quad (Vi)$$

$$[R_uO\text{—}PO_2\text{—}OR_v]^- \quad (Vj)$$

$$[R_u\text{—}PO_3]^{2-} \quad (Vk) \text{ or}$$

$$[R_u\text{—}PO_2\text{—}OR_v]^- \quad (Vl),$$

wherein $R_u$ and $R_v$ independently represent $(C_{1\text{-}10})$alkyl, $(C_{3\text{-}10})$cycloalkyl, $(C_{2\text{-}10})$alkenyl, $(C_{3\text{-}10})$cycloalkenyl, aryl, or heteroaryl, preferably $(C_{1\text{-}8})$alkyl, $(C_{3\text{-}8})$cycloalkyl, $(C_{2\text{-}8})$alkenyl, $(C_{3\text{-}8})$cycloalkenyl, 5- to 6-membered aryl, or 5- to 6-membered heteroaryl.

In one aspect, the method is characterized in that the aramid fibers are para-aramid fibers.

One embodiment is a method for fusing aramid fibers, wherein the aramid fibers are para-aramid, characterized in that the ionic liquid comprises a salt,
the cation being selected from a quaternary ammonium, phosphonium, guanidinium, pyridinium, pyrimidinium, pyridazinium, pyrazinium, piperidinium, morpholinium, piperazinium, pyrrolium, pyrrolidinium, oxazolium, thiazolium, triazinium, imidazolium, triazolium, protonated guanidinium, and the anion being selected from
fluoride,
hydroxide,
alkoxide or aryloxide of the general formula

$$[R_m\text{—}O]^{31} \quad (Ve)$$

wherein $R_m$ represents $(C_{1\text{-}10})$alkyl, $(C_{3\text{-}10})$cycloalkyl, $(C_{2\text{-}10})$alkenyl, $(C_{3\text{-}10})$cycloalkenyl, aryl, or heteroaryl, preferably $(C_{1\text{-}8})$alkyl, $(C_{3\text{-}8})$cycloalkyl, $(C_{2\text{-}8})$alkenyl, $(C_{3\text{-}8})$cycloalkenyl, 5- to 6-membered aryl, or 5- to 6-membered heteroaryl.

The ionic liquids that have proven especially useful in the method for fusing para-aramid are, in addition to the quaternary cation, characterized by anions that may be referred to as particularly coordinating.

According to an exemplary embodiment according to the present invention, $[A]^+$ in Formula I represents an ammonium cation $[R'_1R_1R_2R_3N]^+$, a phosphonium cation $[R'_1R_1R_2R_3P]^+$, a sulfonium cation $[R'_1R_1R_2S]^+$, a heterocyclic, e.g. heteroaromatic cation, or a guanidinium cation of the formula

wherein
$R_1$, $R'_1$, $R_2$, $R'_2$, $R_3$ and $R'_3$ are independently alkyl, alkenyl, alkynyl, cycloalkyl, cycloalkenyl, aryl, or heteroaryl, wherein the latter 7 residues are independently unsubstituted or substituted by
one or more halogens and/or 1 to 3 residues selected from $(C_{1\text{-}6})$alkyl, aryl, heteroaryl, $(C_{3\text{-}7})$cycloalkyl, halogen, $OR_c$, $SR_c$, $NR_cR_d$, $COR_c$, $COOR_c$, $CO\text{—}NR_cR_d$, wherein $R_c$ and $R_d$ are independently $(C_{1\text{-}6})$alkyl, halo$(C_{1\text{-}6})$alkyl, cyclopentyl, cyclohexyl, phenyl, tolyl, or benzyl; or
two of the residues $R_1$, $R'_1$, $R_2$, $R'_2$, $R_3$, $R'_3$ together with the heteroatom to which they are bound form a saturated or unsaturated ring, which is unsubstituted or substituted, and wherein each carbon chain may be interrupted by one or more heteroatoms selected from the group consisting of O, S, NH, or $N(C_{1\text{-}4})$alkyl.

In case of guanidinium cations, $R_1$, $R'_1$, $R_2$, $R'_2$, $R_3$, and $R'_3$ may also independently represent hydrogen.

In Formula I, a cationic heteroaryl residue with the meaning of $[A]^+$ is selected from a 5- or 6-membered heteroaromatic having at least one nitrogen atom as well as optionally one oxygen or sulfur atom and being unsubstituted or substituted, in particular selected from the group of formulas

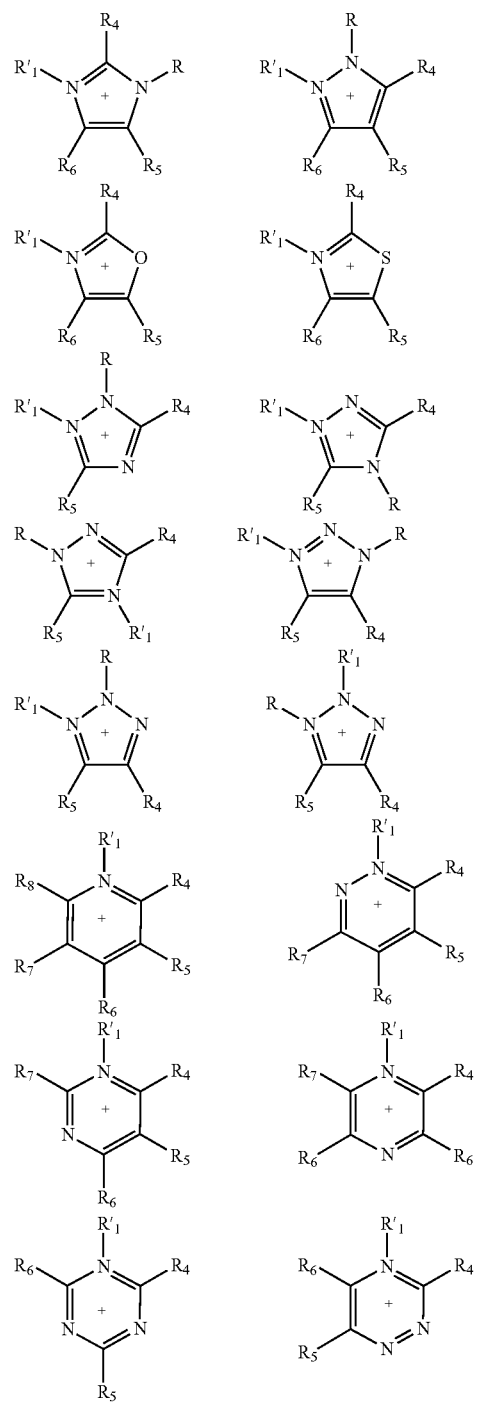

-continued

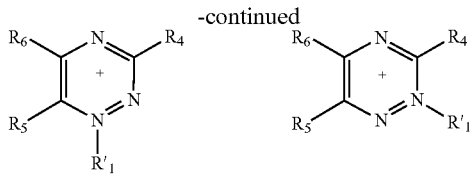

wherein

R and R'₁ independently represent $(C_{1-20})$alkyl, $(C_{3-12})$cycloalkyl, $(C_{2-20})$alkenyl, $(C_{3-12})$cycloalkenyl, aryl, or heteroaryl, the latter 6 residues each being independently, or being substituted by one or more halogen residues and/or 1 to 3 residues selected from the group of $(C_{1-10})$alkyl, aryl, heterocyclyl, $(C_{3-7})$cycloalkyl, halogen, $OR_c$, $SR_c$, $NR_cR_d$, $COR_c$, $COOR_c$, $CO—NR_cR_d$, wherein $R_c$ and $R_d$ independently represent $(C_{1-6})$alkyl, halo $(C_{1-6})$alkyl, cyclopentyl, cyclohexyl, phenyl, tolyl, or benzyl, $R_4$, $R_5$, $R_6$, $R_7$, $R_8$ independently represent hydrogen, halogen, nitro, cyano, $OR_c$, $SR_c$, $NR_cR_d$, $COR_c$, $COOR_c$, $CO—NR_cR_d$, $(C_{1-20})$alkyl, $(C_{3-12})$cycloalkyl, $(C_{2-20})$alkenyl, $(C_{3-12})$cycloalkenyl, aryl, or heteroaryl, wherein the latter 6 residues are independently unsubstituted or substituted by one or more halogens and/or 1 to 3 residues selected from the group of $(C_{1-6})$alkyl, aryl, heteroaryl, $(C_{3-7})$cycloalkyl, halogen, $OR_c$, $SR_c$, $NR_cR_d$, $COR_c$, $COOR_c$, $CO—NR_cR_d$, wherein $R_c$ and $R_d$ independently represent $(C_{1-6})$alkyl, halo$(C_{1-6})$alkyl, cyclopentyl, cyclohexyl, phenyl, tolyl, or benzyl, or two of the residues R, $R_4$, $R_5$, $R_6$, $R_7R_8$, which are adjacent to each other, together with the atom to which they are bound form a ring, which may be unsaturated or aromatic, unsubstituted or substituted, and wherein the carbon chains formed by the respective residues are interrupted by one or more heteroatoms selected from the group of O, S, N, or $N(C_{1-4})$alkyl.

Furthermore, in one compound of Formula I cations of formula $[A]^+$ may be protonated forms of the strong bases 1,5-diazabicyclo[4.3.0]non-5-ene (DBN); 1,8-diazabicyclo [5.4.0]undec-7-ene (DBU); 1,4-diazabicyclo[2.2.2]octane (DABCO®) 1,8-bis-(dimethylamino)naphthaline (Proton Sponge®) N,N,N',N'-tetramethylethylenediamine (TMEDA); 4,5-bis-(dimethylamino)fluorene, or 1,8-bis-(hexamethyltriaminophosphazenyl)-naphthalene.

Particularly preferred cations $[A]^+$ are quaternary ammonium cations $[R'_1, R_1R_2, R_3N]^+$, quaternary phosphonium cations $[R'_1, R_1R_2, R_3P]^+$, or guanidinium cations $R_3R'_3N(C=NR_1R'_1)NR_2R'_2$, wherein $R_1$, $R'_1$, $R_2$, $R'_2$, $R_3$ and $R'_3$ independently represent linear or branched $(C_{1-10})$alkyl, linear or branched $(C_{2-10})$alkenyl—in particular vinyl und allyl, cyclohexyl, phenyl, benzyl, or tolyl, and in the case of guanidinium cations also represent hydrogen.

Particularly preferred are guanidinium (protonated or quaternary guanidine); 1,1,3,3-tetramethylguanidinium, 1,1,2,3,3-pentamethylguanidinium, 1,1,2,2,3,3-hexamethylguanidinium, diethyldimethylammonium, dipropyldimethylammonium, dibutyldimethylammonium, dihexyldimethylammonium, dioctyldimethylammonium, triethylmethylammonium, tripropylmethylammonium, tributylmethylammonium, trihexylmethylammonium, trioctylmethylammonium, trimethylethylammonium, trimethylpropylammonium, trimethylbutylammonium, trimethylhexylammonium, trimethyloctylammonium, tetramethylammonium, tetraethylammonium, tetrapropylammonium, tetrabutylammonium, tetrahexylammonium, tetraoctylammonium, 2-hydroxyethyltrimethylammonium (cholinium), 2-methoxyethyltrimethylammonium (O-methyl-cholinium), triallylmethylammonium, tetramethylphosphonium, triethylmethylphosphonium, tripropylmethylphosphonium, tributylmethylphosphonium, trihexylmethylphosphonium, trioctylmethylphosphonium, triisobutylmethylphosphonium, tributylethylphosphonium, octyltributylphosphonium, N-decyl-N-methylpyrrolidinium, N-octyl-N-methylpyrrolidinium, N-hexyl-N-methylpyrrolidinium, N-butyl-N-methylpyrrolidinium, N-propyl-N-methylpyrrolidinium, N-ethyl-N-methylpyrrolidinium, N,N-dimethylpyrrolidinium, N-allyl-N-methylpyrrolidinium, N-decyl-N-methylmorpholinium, N-octyl-N-methylmorpholinium, N-hexyl-N-methylmorpholinium N-butyl-N-methylmorpholinium, N-propyl-N-methylmorpholinium, N-ethyl-N-methylmorpholinium, N,N-dimethylmorpholinium, N-allyl-N-methylmorpholinium, N-decyl-N-methylpiperidinium, N-octyl-N-methylpiperidinium, N-hexyl-N-methylpiperidinium N-butyl-N-methylpiperidinium, N-propyl-N-methylpiperidinium, N-ethyl-N-methylpiperidinium, N,N-dimethylpiperidinium, N-allyl-N-methylpiperidinium, N-butylpyridinium, N-propylpyridinium, N-ethylpyridinium, N-methylpyridinium, N-decylpyridinium, N-butylpyrrolium, N-propylpyrrolium, N-ethylpyrrolium, N-methylpyrrolium.

Particularly preferred are also 1,3-dimethylimidazolium, 1,2,3-trimethylimidazolium, 1-ethyl-3-methylimidazolium, 1-vinyl-3-methylimidazolium, 1-vinyl-2,3-dimethylimidazolium, 1-propyl-3-methylimidazolium, 1-isopropyl-3-methylimidazolium, 1-butyl-3-methylimidazolium, 1-allyl-3-methylimidazolium, 1-propyl-2,3-dimethylimidazolium, 1-isopropyl-2,3-dimethylimidazolium, 1-allyl-2,3-dimethylimidazolium, 1-ethyl-2,3-dimethylimidazolium, 1-butyl-2,3-dimethylimidazolium, 1-hexyl-3-methylimidazolium, 1-octyl-3-methylimidazolium, 1-decyl-3-methylimidazolium, 1,3-diethylimidazolium, 1,3-dipropylimidazolium, 1,3-dibutylimidazolium.

Also preferred are the protonated forms of the strong bases 1,5-diazabicyclo[4.3.0]non-5-ene (DBN); 1,8-diazabicyclo[5.4.0]undec-7-ene (DBU); 1,4-diazabicyclo-[2.2.2]-octane)(DABCO®).

$[B]^{a-}$ in Formula I is preferably:

fluoride, chloride, bromide, carbonate, alkyl carbonate, methyl carbonate; phosphate; hydrogen phosphate; hydroxide, alkoxide, aryloxide, carboxylate of the general formula $$[R_n—COO]^- \quad (Vd)$$

wherein $R_n$ represents hydrogen, $(C_{1-8})$alkyl, $(C_{3-8})$cycloalkyl, $(C_{2-8})$alkenyl, $(C_{3-8})$cycloalkenyl, aryl, or heteroaryl, the latter 6 residues optionally being substituted by one to two residues selected from the group of $(C_{1-7})$alkyl, aryl, heteroaryl, $(C_{3-7})$cycloalkyl, $OR_c$, $SR_c$, $NR_cR_d$, $COR_c$, $COOR_c$, $CO—NR_cR_d$, wherein $R_c$ and $R_d$ independently represent $(C_{1-7})$alkyl, cyclopentyl, cyclohexyl, phenyl, tolyl, or benzyl, or organic phosphate, or phosphonate of the general formulas $$[R_u—OPO_3]^{2-} \quad (Vi)$$

$$[R_uO—PO_2—OR_v]^- \quad (Vj)$$

$$[R_u\text{—}PO_3]^{2-} \quad \text{(Vk) or}$$

$$[R_u\text{—}PO_2\text{—}OR_v]^- \quad \text{(Vl),}$$

wherein $R_u$ and $R_v$ independently represent $(C_{1-8})$alkyl, $(C_{3-8})$ cycloalkyl, $(C_{2-8})$alkenyl, $(C_{3-8})$cycloalkenyl, aryl, or heteroaryl, the latter 6 residues being unsubstituted or substituted by one or two residues selected from the group of $(C_{1-7})$alkyl, aryl, heteroaryl, $(C_{3-7})$cycloalkyl, $OR_c$, $SR_c$, $NR_cR_d$, $COR_c$, $COOR_c$, $CO\text{—}NR_cR_d$, wherein $R_c$ and $R_d$ independently represent $(C_{1-7})$alkyl, cyclopentyl, cyclohexyl, phenyl, tolyl, or benzyl.

As carbon-containing organic, saturated or unsaturated, acyclic or cyclic, aliphatic, aromatic, or araliphatic residues with 1 to 8 carbon atoms, the residue $R_n$ at the carboxylate of Formula (Vd), the residues $R_u$ and $R_v$ at the organic phosphates of Formulas (Vi) and (Vj), and the organic phosphonates of Formulas (Vk) and (Vl) independently represent preferably

- $(C_{1-8})$alkyl and their aryl-, heteroaryl-, cycloalkyl-, halogen-, hydroxy-, amino-, carboxy-, formyl-, —O—, —CO—, —CO—O—, or —CO—N-substituted components, such as methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, phenylmethyl (benzyl), 2-phenylethyl, cyclopentylmethyl, 2-cyclopentylethyl, 3-cyclopentylpropyl, cyclohexylmethyl, 2-cyclohexylethyl, methoxy, ethoxy, formyl, or acetyl;
- $(C_{3-7})$cycloalkyl and their aryl-, heteroaryl-, cycloalkyl-, halogen-, hydroxy-, amino-, carboxy-, formyl-, —O—, —CO—, or —CO—O-substituted components, such as cyclopentyl, 2-methyl-1-cyclopentyl, 3-methyl-1-cyclopentyl, cyclohexyl, 2-methyl-1-cyclohexyl, 3-methyl-1-cyclohexyl, or 4-methyl-1-cyclohexyl;
- $(C_{2-8})$alkenyl and their aryl-, heteroaryl-, cycloalkyl-, halogen-, hydroxy-, amino-, carboxy-, formyl-, —O—, —CO—, or —CO—O-substituted components, such as 2-propenyl, 3-butenyl, cis-2-butenyl, or trans-2-butenyl;
- $(C_{3-7})$cycloalkenyl and their aryl-, heteroaryl-, cycloalkyl-, halogen-, hydroxy-, amino-, carboxy-, formyl-, —O—, —CO—, or —CO—O-substituted components, such as 3-cyclopentenyl, 2-cyclohexenyl, 3-cyclohexenyl, or 2,5-cycohexadienyl;
- aryl, or heteroaryl with 2 to 8 carbon atoms and their alkyl-, aryl-, heteroaryl-, cycloalkyl-, halogen-, hydroxy-, amino-, carboxy-, formyl-, —O—, —CO—, or —CO—O-substituted components, such as phenyl, 2-methylphenyl (2-tolyl), 3-methylphenyl (3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, or 4-pyridinyl.

In one aspect, $[B]^{a-}$ is preferably fluoride, chloride, bromide, methyl carbonate, carbonate, hydroxide, methoxide, ethoxide, phenolate, phosphate, methyl sulfate, or ethyl sulfate.

If the anion $[B]^{a-}$ is a carboxylate of Formula (Vd), the residue $R_n$ preferably represents hydrogen, phenyl, p-tolyl, linear, or branched $(C_{1-6})$alkyl, such as methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, or octyl.

Particularly preferred carboxylates (Vd) are acetate, methoxyacetate, cyanoacetate, propionate, iso-propionate, acrylate, butanoate, iso-butanoate, methacrylate, valerate, pivalate, caprylate, oxalate, malonate, maleinate, fumarate, succinate, glutarate, pyruvate, phthalate, isophthalate, terephthalates. More preferred carboxylates are formate, acetate, propionate, benzoates.

If the anion $[B]^{a-}$ is an organic phosphate of Formulas (Vi) or (Vj), or an organic phosphonate of Formulas (Vk) or (Vl), $R_u$ and $R_v$ independently preferably represent methyl, ethyl, n-propyl, iso-propyl, n-butyl, iso-butyl, tert-butyl, phenyl, and p-tolyl. Particularly preferred organic phosphates (Vj) are phosphates, diethylphosphates, dibutylphosphates, bis(2-ethylhexyl)-phosphates, diphenylphosphates, dibenzylphosphates. Particularly preferred organic phosphonates (Vl) are p-methylphosphonate, p-ethylphosphonate, dimethylphosphonate, and diethylphosphonate.

In a method according to the present invention, to the described ionic liquids may be added 5-75% by weight of metal salts of the formula $$[M]_x^{b+}[B]_y^{a-},$$

wherein a, b, x and y independently represent the numbers 1, 2, 3, or 4 and wherein the product of x and b is the same as the product of y and a.

Here, preferred metal cations are $Cr^{+2}$, $Cr^{+3}$, $Co^{+2}$, $Co^{+3}$, $Cu^{+1}$, $Cu^{+2}$, $Fe^{+2}$, $Fe^{+3}$, $Mn^{+2}$, $Mn^{+3}$, $Ni^{+2}$, $Ni^{+3}$, $Ti^{+2}$, $Ti^{+3}$, $Li^+$, $Na^+$, $K^+$, $Cs^{2+}$, $Mg^{2+}$, $Ca^{2+}$, $Ba^2$, $Sr^{2+}$, $Zr^{4+}$, $Sn^{2+}$, $Sn^{4+}$, $Ag^+$, $Zn^{2+}$, and $Al^{3+}$, particularly preferred are $Li^+$, $Na^+$, $K^+$, $Mg^{2+}$, $Ca^{2+}$, $Zn^{2+}$, and $Al^{3+}$.

Furthermore, up to 75% by weight of any other, non-coordinating liquid (i.e. not dissolving or partly dissolving aramid) may be added as additive to the described coordinated ionic liquids.

Here, the required amount of the coordinating ionic liquid for partly dissolving an aramid according to the present invention depends on the chemical structure of the aramid, on its polymerization degree, and on the type of ionic liquid, and may easily be determined by preliminary experiments. Numerous experiments for determining the dissolving behavior of aramids are shown in Examples 2 and 3.

It has been shown that dissolving an aramid in a coordinating ionic liquid according to the present invention may be adapted via the temperature. For dissolution, the ionic liquid is thus preferably heated, e.g. to temperatures of 50° C. to 150° C., preferably 50° C. to 100° C., wherein heating may be conducted conventionally or by microwave radiation. For partial dissolution, it may be preferred to work at lower temperatures, for example room temperature, in order to prevent complete dissolution. Also, it will be apparent to the person skilled in the art that the treatment time in step a) of the inventive method for partially dissolving the aramid has to be selected appropriately. In Example 1, the temperature dependency of the dissolution behavior is clearly shown by the fibers of a meta-aramid (Nomex®) being dissolved in 1-ethyl-3-methylimidazolium acetate. While 10% w are not completely soluble at 80° C., heating to 100° C. provides a clear solution.

Furthermore, it has been shown that by adding an anti-solvent to a solution of an aramid in a coordinating ionic liquid according to the present invention, fibers of the aramid may be precipitated from the solution. By adding a suitable anti-solvent, the solvent power may be specifically reduced so that the aramid is only partially dissolved.

Here, an anti-solvent includes a solvent that leads to flocculation of the aramid when added to a solution of the aramid. An anti-solvent is characterized in that it may enter into strong interaction forces with the ionic liquid, so that it competes with the dissolved aramid and may coagulate it as anti-solvent and subsequently precipitate it or prevents complete dissolution thereof. A preferred anti-solvent includes, for example, water, alcohols, such as methanol, ethanol, propanol, butanol, glycol, polyalcohols; amines, such as alkylamines, e.g. 1-propylamine, 1-butylamine; aldehydes, ketones, such as alkylketones, e.g. acetone, methyl ethyl ketone; halogenated carbohydrates, e.g. dichloromethane, nitriles, such as acetonitrile, nitrocarbohydrates, such as nitromethane, and organic acids, such as carboxylic acids, e.g. formic acid, acetic acid, propionic acid.

Precipitation by adding an anti-solvent thus also represents an option for carrying out step c) of the inventive method, in which step the partially dissolved area of the aramid is re-coagulated after connecting. Here, the ionic liquid is treated with an anti-solvent for precipitating the aramid, and the obtained fused aramid fibers are optionally isolated from the mixture.

In one aspect, the method is characterized in that the partially dissolved area of the aramid is re-coagulated by
  i) precipitating the aramid by adding an anti-solvent, or
  ii) removing the ionic liquid by heating to a temperature above the thermal decomposition point of the ionic liquid, but below the thermal decomposition point of the aramid, wherein the ionic liquid is removed in the form of gaseous decomposition products; or below its thermal decomposition point, as long as the coordinating ionic liquid has a vapor pressure sufficiently high to allow distilling it off optionally in vacuum, or
  iii) polymerizing the ionic liquid, or
  iv) a combination thereof.

In a first variation i), the present invention thus provides a method for fusing aramid fibers, characterized in that the aramid fibers partially dissolved in the coordinating ionic liquid are treated with an anti-solvent for precipitating the aramid, and the obtained fused aramid fibers are optionally isolated from the mixture. Here, the required amount of the anti-solvent for variation i) may easily be determined by preliminary experiments. It was, for example, shown that the addition of one to five parts of water to a solution of an aramid in a coordinating ionic liquid is sufficient to precipitate aramid fibers from the solution.

Aramids are in general thermally (up to approximately 400° C.) very stable, while coordinating ionic liquids are already instable at temperatures around 100-250° C., so that the ionic liquid may decompose into molecular compounds at the given temperatures, which may be volatilized, optionally accelerated by applying vacuum. Since the ionic liquid is removed in this way, aramid fibers may also be caused to re-coagulate by thermal treatment. In this aspect, we refer to ionic liquids as described in WO 2009/027250 to BASF SE. These compounds are in a chemical equilibrium with neutral, non-ionic compounds. Via these neutral products, the ionic liquid may be distilled off for purification or separation of contaminations. In the sense of the present method, the ionic liquid may thus be removed, as shown in Example 9, and the aramid may be caused to coagulate. The class of ionic liquids, that may be removed in this way, comprises, for example, the ones with a cation selected from the group comprising 1,3-dimethylimidazolium, 1,3-diethylimidazolium, 1-ethyl-3-methylimidazolium, 1-propyl-3-methylimidazolium, and 1-butyl-3-methylimidazolium, and with an anion selected from chloride, formate, acetate, propionate, dimethylphosphate, diethylphosphate, dibutylphosphate, dimethylphosphonate, and carboxylate (linear or cyclic with one or two carboxylate groups).

Similarly, the present invention provides a method for producing aramid fibers, characterized in that a solution of an aramid in a coordinating ionic liquid is heated to a temperature above the thermal decomposition point of the ionic liquid, but below the thermal decomposition point of the aramid, so that the ionic liquid is removed in the form of gaseous decomposition products and the fused aramid is obtained.

A further alternative to restore the native structure of aramid fibers is to remove the ionic liquid as reagent for partial dissolution via chemical modification. Here, the components of the ionic liquid may be selected so that they may be polymerized. After polymerization, they are not available anymore as suitable means for partially dissolving the aramid, and the aramid precipitates in a fused form. A person skilled in the art may select ionic liquids that may be removed in this way based on their functionalities. Suitable for polymerization are, for example, ionic liquids having a cation and/or anion with unsaturated carbohydrate side chains. Polymerizable cations are e.g. 1-vinyl-3-methylimidazolium, 1-allyl-3-methylimidazolium, triallylmethylammonium, which also polymerize independently of anions. Examples of polymerizable anions are e.g. acrylates and allyl carbonate. However, a skilled person can also select from further coordinating anions with double bonds.

Several methods may be combined for coagulation that aim at achieving the native interactions of the aramids and eliminating the partial dissolution of the fibers.

In a further aspect, the invention relates to fused aramid fiber(s).

A fused aramid fiber according to the present invention may, for example, be a single aramid fiber that is fused with itself in several areas. For example, a fused aramid fiber may form a ring in which ring closure has been achieved by fusing the ends of the same fiber. Also, fused aramid fibers may comprise a first and at least one other aramid fiber that are fused to each other in at least one contact area. Fused aramid fibers are also two-dimensional arrangements consisting of several aramid fibers of a fabric fused to each other. A fused area may, for example, be microscopically discernible via the course of a fiber.

In particular, the invention relates to fused aramid fibers obtainable with an inventive method.

In a further aspect, the invention provides a shaped article made of fused aramid.

An inventive shaped article may have different shapes. Aramid fibers and sheets fused side by side allow the manufacture of two-dimensional, planar aramid shaped articles of any size. Suitably only the peripheral areas of the individual units are partially dissolved, contacted with each other and connected according to the invention. Due to the fusing, these junctions have a stability that is comparable with that within the individual units, but at least better than when the units are attached to each other via alternative connections. According to the invention, fused sheets or films may, contrary to calendered fabrics, have a surface of practically any shape and size. And they have preferred material properties compared to bonded surfaces.

For producing three-dimensional shaped articles, aramid fibers or units stacked on top of each other may be fused. By means of templates or supports for providing the external shape, it is also possible to obtain hollow articles and practically any shape. Three-dimensional aramid shaped articles may, depending on their design and purpose, maintain their own shape, i.e. contrary to sheets have the necessary stiffness in order to serve as a component. For high strength, it has proven advantageous to heat the shaped article following coagulation as after-treatment. This improves the complete removal of the anti-solvent and coagulation. It is also advantageous if the fibers are not only fused together at intersections, but along longer parallel aramid fiber areas.

Also, aramid fabrics, i.e. arrangements of aramid fibers, may be modified according to the inventive method so that individual fibers are connected to each other or merge. Contrary to aramid fabrics known so far used for bullet-resistant clothing, this also allows the manufacture of stab-proof materials for protective clothing because the individual aramid fibers do not avoid the stabbing tool anymore so that no penetration gaps evolve.

In addition, the invention provides a conveyor belt comprising a carcass characterized in that the carcass comprises a shaped article made of fused aramid.

Conveyor belts are used in conveyor facilities or belt conveyors, which, as used in this invention, also comprise transport belts. Here, the carcass forms the tensile force transferring element and is used synonymously with the term tension member.

The carcass of an inventive conveyor belt is preferably made of at least one sheet-like aramid band or parallel aramid fibers that have been closed into a ring by means of a fused contact point. This provides the desired tensile strength along the entire length of the conveyor belt. Furthermore, the inventive carcass guarantees good impact protection.

In addition to these uses, inventive shaped articles are also suitable for vehicle construction, e.g. for aviation. In aviation, in particular, fused aramid may be used advantageously because the production of a stable connection (contrary to loose aramid fibers) eliminates or at least reduces the need of a surrounding polymer matrix. This does not only save material, but also solves the problem of saving weight.

The inventive findings regarding dissolving and partially dissolving aramids with ionic liquids may also be advantageously transferred to other methods with aramids. Examples comprise modifying the surfaces of aramids, e.g. for connecting them to other materials (chemical coupling agent), the production of composites in which an aramid and another polymer/biopolymer are simultaneously partially dissolved with a coordinating ionic liquid and fused to each other by adding an anti-solvent, the production of a solution of aramids in a coordinating ionic liquid and its general use as adhesive with high strength as well as for bonding/fusing together aramids or other polymers and biopolymers that are swellable or soluble in the ionic liquid, wherein the coagulation of the dissolved aramid may be achieved by adding suitable liquid- or vapor-phase anti-solvents or by absorption of air humidity, since coordinating ionic liquids are in particular highly hygroscopic, the removal of aramids from material surfaces in the sense of cleaning.

In the following examples all temperatures are in degrees Celsius (° C.). In addition to experiments about the dissolution behavior of aramids, the examples also show exemplary embodiments of the method for fusing aramid fibers as well as the manufacture of shaped articles according to the invention.

Example 1

Nomex® 1780 dtex fibers were dissolved at 80° C. for 3 h in 1-ethyl-3-methylimidazolium acetate with magnetic stirring. The addition of 5% w of Nomex® fibers resulted in a clear, viscous solution. When 10% w Nomex® fibers were added, initially not all fibers dissolved completely, but heating to 100° C. again provided a clear, viscous solution. At 100° C. further addition of Nomex® fibers increased the concentration to clearly dissolved 20% w, which resulted in a highly viscous solution.

To 10 g of 1-ethyl-3-methylimidazolium acetate (CAS 143314-17-4; content HPLC>98% w, water<1% w), 100 mg of Technora® T-240 220 dtex fibers were added and magnetically stirred overnight in a sealed round-bottomed flask at 80° C. The aramid copolymer fibers dissolved completely and a homogenous mixture was obtained. After cooling and adding approx. 50% w of water as anti-solvent, the fibers were re-precipitated and at least partially "wound" around a glass capillary by stirring with the capillary. The addition of approx. 10% w of water resulted in turbidity with beginning precipitation. It can be assumed that 1-ethyl-3-methylimidazolium acetate with up to 10% w of water is still able to dissolve Technora® fibers.

Example 2

3 mg each of Technora® T-240 220 dtex fibers (para-aramid copolymer) and Nomex® 1780 dtex fibers (meta-aramid) were treated with 1 g each of the following, dry (<1% w water) ionic liquids or salts and stirred for three hours at 100° C. The solvation behavior of the aramid fibers was observed and measured, leading to the results shown in Table 3.

TABLE 3

| No. | Ionic liquid/salt | CAS No. | Technora ® | Nomex ® |
|---|---|---|---|---|
| 1 | 1-Ethyl-3-methylimidazolium acetate | 143314-17-4 | Compl. diss. | Compl. diss. |
| 2 | 1-Butyl-2,3-dimethylimidazolium chloride | 98892-75-2 | Compl. diss. | Compl. diss. |

TABLE 3-continued

| No. | Ionic liquid/salt | CAS No. | Technora ® | Nomex ® |
|---|---|---|---|---|
| 3 | 1-Butyl-3-methylimidazolium acetate | 284049-75-8 | Compl. diss. | Compl. diss. |
| 4 | 1-Butyl-3-methylimidazolium chloride | 79917-90-1 | Compl. diss. | Compl. diss. |
| 5 | 1-Ethyl-3-methylimidazolium diethylphosphate | 848641-69-0 | Compl. diss. | Compl. diss. |
| 6 | 1-Ethyl-3-methylimidazolium benzoate | 150999-33-0 | Compl. diss. | Compl. diss. |
| 7 | 1-Ethyl-3-methylimidazolium dimethylphosphonate | 1059603-87-0 | Compl. diss. | Compl. diss. |
| 8 | 1-Hexyl-3-methylimidazolium chloride | 171058-17-6 | Compl. diss. | Compl. diss. |
| 9 | 1-Octyl-3-methylimidazolium chloride | 64697-40-1 | Compl. diss. | Compl. diss. |
| 10 | Tributylmethylammonium acetate | 131242-39-2 | Compl. diss. | Compl. diss. |
| 11 | Tributylmethylphosphonium dibutylphosphate | 947601-89-0 | Compl. diss. | Gelled |
| 12 | Tributylmethylphosphonium methyl carbonate | 120256-45-3 | Compl. diss. | Gelled |
| 13 | Methoxyethyltrimethylammonium acetate | | Compl. diss. | Compl. diss. |
| 14 | 1-Ethyl-3-methylimidazolium octanoate | 1154003-55-0 | Compl. diss. | Compl. diss. |
| 15 | 1-Ethyl-3-methylimidazolium decanoate | 1289051-61-1 | Compl. diss. | Compl. diss. |
| 16 | 1,1,3,3-Tetramethylguanidinium acetate | 16836-76-3 | Gelled | Part. diss. |
| 17 | 1-Decyl-3-methylimidazolium chloride | 171058-18-7 | Gelled | Gelled |
| 18 | Trioctylmethylammonium acetate | 35675-83-3 | Gelled | part. diss. |
| 19 | Tetrabutylammonium chloride | 1112-67-0 | Compl. diss. | Gelled |
| 20 | 1-Benzyl-3-methylimidazolium chloride | 36443-80-8 | Gelled | Gelled |
| 21 | Trioctylmethylphosphonium chloride | 35675-28-6 | Compl. diss. | part. diss. |
| 22 | Trioctylmethylphosphonium acetate | | Compl. diss. | part. diss. |
| 23 | 1-Ethyl-3-methylimidazolium methyl sulfate | 516474-01-4 | Unchanged | Gelled |
| 24 | Tributylammonium chloride | 38466-21-6 | Unchanged | Unchanged |
| 25 | 1-Ethyl-3-methylimidazolium sulfate | 143314-18-5 | Unchanged | Unchanged |
| 26 | 1-Ethyl-3-methylimidazolium ethylphosphonate | 1159682-38-8 | Unchanged | Unchanged |
| 27 | 1-Butyl-3-methylimidazolium nitrate | 179075-88-8 | Unchanged | Unchanged |
| 28 | 1-Butyl-3-methylimidazolium tetrachloroferrate | 359845-21-9 | Unchanged | Unchanged |
| 29 | 1-Butyl-3-methylimidazolium tetrafluoroborate | 174501-65-6 | Unchanged | Unchanged |
| 30 | 1-Ethyl-3-methylimidazolium methanesulfonate | 145022-45-3 | Unchanged | Unchanged |
| 31 | 1-Ethyl-3-methylimidazolium thiocyanate | 331717-63-6 | Unchanged | Unchanged |
| 32 | 1-Ethyl-3-methylimidazolium trifluormethanesulfonate | 145022-44-2 | Unchanged | Unchanged |
| 33 | Dimethyl-2-hydroxyethylammonium propionate | 932394-20-2 | Unchanged | Unchanged |
| 34 | Triethylammonium methanesulfonate | 93638-15-4 | Unchanged | Unchanged |
| 35 | 1-Ethyl-3-methylimidazolium salicylate | 945611-28-9 | Unchanged | Unchanged |
| 36 | 1-Ethyl-3-methylimidazolium octadecanoate | 888724-53-6 | Unchanged | Unchanged |
| 37 | Lithiumacetate dehydrate | 6108-17-4 | Unchanged | Unchanged |
| 38 | Zinc chloride monohydrate | 21351-92-8 | Unchanged | Unchanged |
| 39 | N-Methylmorpholine-N-oxide monohydrate | 70187-32-5 | Unchanged | Unchanged |
| 40 | Choline chloride-urea mixture (molar ratio 1:2, Deep Eutectic Solvent) | 8069-55-4 | Unchanged | Unchanged |
| 41 | Tributylmethylphosphonium phosphate/ DMSO 1:1 | | Compl. diss. | Compl. diss. |

The aramid fibers that were treated with the ionic liquids No. 1-15 dissolved completely and could be re-precipitated by adding water as anti-solvent. The ionic liquids 16 to 19 showed strong swelling activity, but both investigated fiber types were only gelled or partially, but not completely, dissolved; the ionic liquids 20 to 22 only partially dissolved the surface of the aramid copolymer. Also, with the ionic liquids 16 to 22 the swelling process could be reversed by adding water. All other ionic liquids (24 to 36) left the fibers unchanged. The comparative examples 37 to 40 represent salt melts or organic compounds that are known to the person skilled in the art for dissolving other fibers, such as N-methylmorpholine-N-oxide monohydrate. It has been shown that these agents are, other than ionic liquids, not suitable for dissolving aramid fibers. This is obviously also true for No. 40, a member of the so-called "deep eutectic solvents"; here, the cholinium cation coordinates with urea and not with the aramid fiber. No. 41 shows that a mixture of an ionic liquid with a co-solvent also has good dissolution behavior.

This suggests that the dissolution ability depends on the specific properties of ionic liquids. In addition, there are also differences in the dissolution properties among the ionic liquids. Regarding the cation, it should be quaternary. Unsuitable for dissolving are protonated cations, the basicity of which is too low, e.g. ionic liquids No. 24, 33, and 34. Dissolution also depends on the anion—which must be strongly coordinating. Increased basicity of the anion or no acidic protons also seems to be advantageous.

With increasing size or side-chain length of the quaternary cations, solvent power of the ionic liquid decreases, which is shown by the fact that the aramids are not completely, but only partially, dissolved or gelled. This "modulated" solvent power may be desired to only superficially fuse fibers with themselves or other polymer fibers without completely dissolving the entire fiber, or for fusing together the interior filaments of a fiber. A comparison of the 1-positions of differently substituted 3-methylimidazoline chloride salts shows that 1-butyl (No. 3) and 1-octyl (No. 9) completely dissolve the fibers, while 1-decyl (No. 17) results in gelling of both fiber types, as does the bulky and inflexible 1-benzyl residue (No. 20).

Interestingly, 1-ethyl-3-methylimidazolium methyl sulfate (No. 23)—the only representative of the examined compound with sulfur-containing anions—gelled Nomex® fibers. It seems that alkyl sulfates with short alkyl chains are probably suitable coordinating anions due their relatively high oxygen content. These representatives of ionic liquids are commercially easily available. Consequently, the ionic liquids with the anion methyl sulfate, or ethyl sulfate may be preferred ionic liquids for inventive methods.

Example 3

3 mg each of Kevlar® K29 fibers (para-aramid) were treated with 1 g each of the following ionic liquids and stirred for three hours at 100° C. The solvation behavior of the aramid fibers in different ionic liquids was observed and measured, leading to the results shown in Table 4.

TABLE 4

| No. | Ionic liquid/salt | CAS No. | Kevlar® |
|---|---|---|---|
| 1 | 1-Ethyl-3-methylimidazolium fluoride | 133928-43-5 | Gelled |
| 2 | 1-Ethyl-3-methylimidazolium fluoride/DMSO 1:1 | 133928-43-5 | Compl. diss. |
| 3 | Tetrabutylammonium fluoride hydrate | 22206-57-1 | Undissolved |
| 4 | Tetrabutylammonium fluoride hydrate/DMSO 1:1 | 22206-57-1 | Alm. compl. diss. |
| 5 | Tetrabutylammonium fluoride/DMSO 1:1 | 429-41-4 | Compl. diss. |
| 6 | Tetrabutylammonium hydroxide/DMSO 1:1 | 2052-49-5 | Compl. diss. |
| 7 | Dimethylmorpholinium hydroxide/DMSO 1:1 | 69013-77-0 | Gelled |
| 8 | Tetrabutylammonium fluoride/N-methyl-2-pyrrolidone 1:1 | 429-41-4 | Gelled |
| 9 | Tetrabutylammonium fluoride/N-methyl imidazole 1:1 | 429-41-4 | Gelled |
| 10 | Tetrabutylammonium fluoride/pyridine 1:1 | 429-41-4 | Gelled |
| 11 | Tetrabutylammonium fluoride/triethylphosphate 1:1 | 429-41-4 | Unchanged |

In all other ionic liquids and salts described in Example 2, Kevlar® K29 was completely undissolvable. A comparison between Example 2 and Example 3 shows that the para-aramid fiber Kevlar® behaves differently from the meta-aramid fiber Nomex® or the para-aramid copolymer Technora®. It can be assumed that the hydrogen bonds are particularly strong within the interaction of two para-aramid polymers, on the one hand because of the strongly polarized N—H bonds through the para-position, and on the other hand because of the optimal geometric arrangement. Only those ionic liquids are suitable for dissolving a para-aramid fiber that have strongly coordinating anions. Gelling was shown with the halide fluoride as anion (No. 1), with dry variations being more suitable than a hydrate (No. 3). As anion of an ionic liquid, hydroxide is also suitable for partial dissolution (No. 6 and 7). Alkoxides and aryloxides are also suspected to be suitable anions. Regarding the cations, at least partial dissolution was achieved for heteroaromatic cations (No. 1 and 2) as well as quaternary ammonium compounds (No. 3 to 10).

In addition, DMSO as co-solvent has shown to be suitable for complete dissolution in order to improve the dissolution properties of the para-aramid fibers (No. 2, 4, 5, and 6). The same effect as co-solvent was also shown for other organic compounds (No. 8 to 10).

Example 4

100 mg of Technora® T-240 220 dtex fibers were treated with 10 g of dry 1-butyl-3-methylimidazolium acetate (BMIM-OAc), sealed and put into a drying chamber for 3 hours at 80° C. with shaking from time to time. A viscous solution was obtained. Then the aramid solution (IL) was treated with various solvents (LM) in a volume ratio of IL:LM and stirred. The effects of various solvents on a solution of aramid copolymer fibers in 1-butyl-3-methylimidazolium acetate are shown in Table 5.

TABLE 5

| No. | Solvent | ε | α | β | π* | IL:LM | Observation |
|---|---|---|---|---|---|---|---|
| 1 | Dimethyl sulfoxide | 46.5 | 0.00 | 0.76 | 1.00 | 1:1-1:10 | Clear solution |
| 2 | N,N-Dimethylformamide | 36.7 | 0.00 | 0.69 | 0.88 | 1:1-1:10 | Clear solution |
| 3 | N-Methyl-2-pyrrolidone | 32.2 | 0.00 | 0.77 | 0.92 | 1:1-1:10 | Clear solution |
| 4 | N-Methylimidazole | — | 0.00 | 0.82 | — | 1:1-1:10 | Clear solution |
| 5 | Pyridine | 12.9 | 0.00 | 0.64 | 0.87 | 1:1-1:10 | Clear solution |
| 6 | Triethyl phosphate | 13.0 | 0.00 | 0.77 | 0.72 | 1:1-1:10 | Clear solution |
| 7 | Acetonitrile | 35.9 | 0.19 | 0.40 | 0.66 | 1:5 | Spont. floccing |
| 8 | Acetic acid | 6.2 | 1.12 | 0.45 | 0.64 | 1:5 | Spont. floccing |
| 9 | Methanol | 32.7 | 0.98 | 0.66 | 0.60 | 1:5 | Spont. floccing |
| 10 | Nitromethane | 35.9 | 0.22 | 0.06 | 0.75 | 1:5 | Spont. floccing |
| 11 | 2-Propanol | 19.9 | 0.76 | 0.84 | 0.48 | 1:5 | Spont. floccing |
| 12 | Water | 78.4 | 1.17 | 0.47 | 1.09 | 1:5 | Spont. floccing |
| 13 | 1-Butylamine | 5.4 | 0.00 | 0.72 | 0.31 | 1:5 | Slow floccing |
| 14 | 1-Propylamine | — | — | — | — | 1:5 | Slow flocking |

TABLE 5-continued

| No. | Solvent | ε | α | β | π* | IL:LM | Observation |
|---|---|---|---|---|---|---|---|
| 15 | Acetone | 20.6 | 0.08 | 0.48 | 0.62 | 1:5 | Slow flocking |
| 16 | Dichloromethane | 8.9 | 0.13 | 0.10 | 0.73 | 1:5 | Slow flocking |
| 17 | 1,4-Dioxane | 2.2 | 0.00 | 0.37 | 0.49 | 1:5 | Inmiscible, turbidity |
| 18 | Ethyl acetate | 6.0 | 0.00 | 0.45 | 0.45 | 1:5 | Inmiscible, turbidity |
| 19 | Tetrahydrofuran | 7.6 | 0.00 | 0.55 | 0.55 | 1:5 | Inmiscible, turbidity |
| 20 | Toluol | 2.4 | 0.00 | 0.11 | 0.49 | 1:5 | Inmiscible |

The results from Table 5 show the behavior after addition of these solvents and puts this behavior in relation to the relative dissociation constant c and the Kamlet-Taft solvent parameters α, β and π* ("Solvents and Solvent Effects in Organic Chemistry"; Christian Reichardt, WILEY-VCH, Weinheim 2003, ISBN 3-527-30618-8; Kamlet, M. J.; Abboud, J. L.; Taft, R. W. J. Am. Chem. Soc. 1977, 99, 6027; Kamlet, M. J.; Taft, R. W. J. Am. Chem. Soc. 1976, 98, 377; Kamlet, M. J.; Hall, T. N.; Boykin, J.; Taft, R. W. J. Org. Chem. 1979, 44, 2599; Taft, R. W.; Kamlet, M. J. J. Am. Chem. Soc. 1976, 98, 2886).

Based on the results in Table 5, the solvents may be divided in three groups:

Group III: The solvents No. 17-20 show low dielectric constants (ε<8), lack hydrogen bond donor properties (α=0) and have low to medium hydrogen bond acceptor properties (β<0.55). The interactive forces of these solvents are too low to be able to dissolve the coordinating ionic liquid and are thus not suitable. This group comprises e.g. esters, ethers, hydrocarbons.

Group II: The solvents No. 7-16 show either low dielectric constants of ε=5-9, but very high values for α (acetic acid), β (1-butylamine), or π* (dichloromethane), or they show high dielectric constants of ε=20-78 and at least a medium to high value for α, β and π*. They are thus characterized in that they may enter into a strong interaction with the ionic liquid, so that they may compete with the dissolved aramid and coagulate it as anti-solvent and ultimately precipitate it. Particularly suitable are such solvents that show a high α value (α>0.7), i.e. act via hydrogen bonds as strong donors and block the hydrogen bond acceptors—i.e. the coordinating anions—in the ionic liquid. This group comprises water, alcohols, carboxylic acids, amines, aldehydes, ketones, dichloromethane, acetonitrile, and nitromethane, particularly preferred water; alcohols such as methanol, ethanol, propanol, butanol, glycol, polyalcohols; carboxylic acids such as formic acid, acetic acid, propionic acid; ketones such as acetone, methyl ethyl ketone. In general, solvents are preferred with ε≥5, α≥0.22, and β and/or π*≥0.4, particularly preferred are those with ε≥5, α≥0.7 and β and/or π*≥0.4.

Group I: The solvents No. 1-6 show medium to high dielectric constants of ε=13-47, lack hydrogen bond donor properties (α=0), have high hydrogen bond acceptor properties (β>0.6) and very high bipolarity/polarizability π*>0.7).

They are obviously able to maintain in solution the Kevlar polymer dissolved in the ionic liquid by coordinative bonds together with the ionic liquid; since the high values of ε and β are on the one hand typical for solvents, which—as is known to the skilled person—are good in dissolving ions, and at the same time no hydrogen bonds to the anions are formed (α=0), the coordinative bonds of the anions to the Kevlar polymer are obviously maintained and the polymer also remains in solution. This group thus comprises all high-polar aprotic solvents, such as aromatic nitrogen heterocycles, cyclic and linear carboxylic acid amides, sulfoxides, sulfones, alkyl phosphoric esters and amides, cyclic carbonic acid esters. Preferred are in general those solvents that have ε≥10, α<0.05, β>0.60 and/or π*>0.65, such as for example pyridines, dimethyl cyanamides, chinolines, N,N-dimethyl formamides, N,N-dimethyl acetamides, N,N-diethyl acetamides, dimethyl sulfoxides, triethyl phosphates, trimethyl phosphates, tributyl phosphates, N-methylpyrrolidones, dimethyl phthalates, N,N,N',N'-tetramethyl urea, thiolane-1-oxides, N,N,N',N'-tetramethyl guanidines, N-alkyl imidazoles, anilines, dialkyl sulfoxides, diaryl sulfoxides.

The results described in Example 4 show that solvents of Group 1 are ideal co-solvents to e.g. adjust the viscosity and the solidifying point of the ionic aramid solution, to modulate the solvation properties of the ionic liquid (see Example 3), to conduct chemical reactions and modifications of the dissolved Kevlar polymer, to dissolve educts for such reactions, to dissolve additives, to modify surface tension and wettability, to reduce foams, to modify or partially dissolve material surfaces to which the aramid is to be connected or fused (see Example 5), etc. They also show that solvents of Group II are suitable as anti-solvents in order to cause the dissolved aramid to re-coagulate and precipitate (see Examples 1 to 3), or in lower dosages they are suitable to reduce the solvent power of the ionic liquid and adjust it to a desired value. The latter can e.g. be necessary to fuse aramid fibers with themselves or with other polymer fibers only superficially without completely dissolving the entire fiber, or to fuse together the interior filaments of a fiber.

Example 5

To 60 mg of Technora® T-240 220 dtex fibers were added 2 g of dry 1-butyl-3-methylimidazolium acetate, sealed and put into a drying chamber for 3 hours at 80° C. with stirring from time to time. A high-viscosity, tenacious solution was obtained. Then the solution was aspirated into a 1 ml plastic syringe without cannula, provided with a fine cannula ("insulin cannula" 0.3×12 mm) and injected into a water bath. A light yellow thread of the aramid copolymer was obtained, which could be taken out of the bath and which showed the typical color of the original fibers after drying.

A solution of 3 mg of Kevlar®-K29 in 1 g of a solvent consisting of tetrabutylammonium hydroxide/DMSO 1:1 was prepared. The solvent was prepared by mixing a 40% aqueous solution of tetrabutylammonium hydroxide and dimethyl sulfoxide in a mass ratio of 1:1 (in relation to the pure tetrabutylammonium hydroxide contained in the 40% aqueous solution) and removing the water in vacuo at 70° C. and decreasing the pressure to 20 mbar. The aramid was already added at this point and dissolved. After dissolving the aramid, 2 phases were observed: a red-colored, viscous phase containing the dissolved aramid, and a colorless, low-viscosity phase probably consisting of excessive DMSO. The red-colored, viscous phase was aspirated into a syringe. Injection into a water bath resulted in the coagulation of the dissolved Kevlar® K29, and a characteristically colored thread was obtained, which could be removed after 2 hours waiting time and was thermically after-treated at 90° C. in the a chamber.

Example 6

4 pieces of approx. 3 cm long und approx. 1 mm thick Technora® T-240 220 dtex threads (spun fibers of para-aramid copolymer) were dipped for approx. 10 seconds into dry 1-butyl-3-methylimidazolium acetate until they were complete wetted, and excess ionic liquid was removed by wiping off with cellulose. The threads prepared accordingly were quickly (the ionic liquid is hygroscopic and water acts as anti-solvent) laid down in the shape of a square with the corners intersecting on an object slide and a second object slide was put on top. The two object slides were held together at the edges by means of metal clips so that a constant pressure was applied to the intersecting threads wetted with the ionic liquid.

The experimental setup was put into a drying chamber for one hour at 80° C. and then immersed into a beaker containing water with the clips still in place. By repeated immersion, leaving for 5 minutes, and removal the ionic liquid present between the object slides was washed off the fibers. The clips were removed and a mechanically stable square made of the threads was obtained.

Under the microscope it was observed that an untreated thread in the image consisted of numerous individual, clearly discernible fibers. In contrast, the individual fibers of the treated fibers were melted together and the intersection point was fused, which could be clearly seen at the curved transition between the horizontal and the vertical thread.

Example 7

Two approx. 50 cm long pieces of an approx. 2 mm wide Nomex® 1780 dtex yarn (meta-aramid) were each coated by means of a standard 1 cm wide bristle brush at one end over a length of 5 cm with the ionic liquid 1-ethyl-3-methylimidazolium acetate (EMIM-OAc, CAS 143314-17-4; content HPLC>98% w, water<1% w) until soaked. As shown in FIG. 1, the ends of threads 102 und 103 thus treated were then laid down in an exactly overlapping way on a standard object slide 101 made of glass by means of pincers. The length L of the overlapping area was 5 cm. By means of cellulose, excessive ionic liquid was removed, taking care not to change the overlapping position of the two yarn ends.

The object slide thus prepared was then heated for 1 hour at T=90° C. in a drying chamber. The object slide with the yarn pieces was then taken out of the drying chamber, cooled off a little and carefully spayed with distilled water along the yarn pieces by means of an atomizer, wherein the meta-aramid gelled in the ionic liquid started coagulating by absorbing water. The object slide including the yarn pieces was then rinsed for 2 hours in water at 50° C. (beaker with magnetic stirrer) in order to remove any remaining ionic liquid EMIM-OAc. The fused yarn pieces were then put into the drying chamber for 2 h at 105° C. for thermal after-treatment.

During heating, the Nomex® yarn became optically translucent, and after coagulating with water as anti-solvent a white solid with the same color as the original Nomex® yarn was obtained. The after-treatment in the drying chamber resulted in increased hardness of the fused point, as could be clearly determined haptically.

Example 8

In analogy with Example 7, 5 pieces of fused Nomex® 1780 dtex yarns were prepared, with three variations a.)-c.) with the following differences:

Use of undiluted EMIM-OAc, overlapping 5 cm (s. Example 6)

Use of an only 20% aqueous solution of EMIM-OAc (application of small amount), overlapping 5 cm; after 45 min heating to T=90° C. a second slide was added and pressure was applied to the two object slides and the Nomex® yarn in between by means of metal clips, in order to guarantee good mechanical contact between to two treated yarn ends. It was then heated for further 15 min to T=90° C., followed by rinsing the entire setup for one hour in warm water at 50° C. (beaker with magnetic stirrer), the setup was taken apart, and the fused yarns were further treated as described in Example 6 (rinsing for 2 h at 50° C., thermal after-treatment 2 h 105° C.)

Use of undiluted EMIM-OAc, but overlapping length L only 1 cm.

The tensile strengths of the yarn samples were estimated as follows:

A 20 kg weight consisting of a jerrycan of a suitable size filled with water was put on a top-loading balance, the balance having a measuring range of max. 60 kg and an accuracy of d=10 g. The display was calibrated to 0.00 kg with the weight. The Nomex yarn to be tested was attached by means of a knot to the handle of the jerrycan, and the other end was attached to a metal rod (length=20 cm, diameter 1 cm). By slowly lifting the metal rod, load was applied to the yarn until break, the display of the top-loading balance showing a negative value due to the load reduction. The maximum value corresponded to the tensile strength (load at break) in kg, which multiplied with the mean gravitational acceleration of 9.81 m·s$^{-2}$ resulted in the estimated tensile strength in Newton. The following values and standard errors were found:

Untreated yarn (reference): $F_{max}$=60.8±2.4 N

Example 7a: $F_{max}$=50.0±4.8 N (82% of reference)

Example 7b: $F_{max}$=47.1±5.9 N (77% of reference)

Example 7c: $F_{max}$=31.4±5.0 N (52% of reference)

It could be shown that in the present, suboptimal basic experiments, already tensile strengths close to the tensile strength of the untreated Nomex® 1780 dtex yarn were achieved.

Example 9

In analogy with Example 7, two approx. 50 cm long pieces of an approx. 2 mm wide, spun Nomex® 1780 dtex yarn (meta-aramid) were fused together over a length of 5 cm. In contrast to Example 7, however, the aramid was not coagulated by adding water after the first thermal treatment of one hour at 90° C., but step c) was carried out by an alternative variation. The ionic liquid EMIM-OAc used was a compound having a chemical equilibrium with neutral, non-ionic liquids, which may be distilled off as described in WO2009027250 to BASF SE. For removal, the yarn partially dissolved by means of EMIM-OAc, was subjected to a temperature of 150° C. and a pressure of 0.05 mbar together with the object slide in a vacuum drying chamber for 2 hours. By treatment in vacuum, the ionic liquid was removed via neutral, vaporizable molecular compounds and the two Nomex® 1780 dtex yarns were fused.

Example 10

Two pieces of approx. 50 cm long and approx. 2 mm wide, spun Nomex® 1780 dtex yarn (meta-aramid) were covered over a length of 1 cm with the ionic liquid 1-hexyl-3-methylimidazolium chloride, CAS 171058-17-6 (content HPLC>98% w, water<1% w) and then treated as described for Example 7. A strongly fused yarn was obtained.

Example 11

Two pieces of approx. 50 cm long and approx. 2 mm wide, spun Nomex® 1780 dtex yarn (meta-aramid) were covered over a length of 1 cm with the ionic liquid tributylmethylammonium acetate, CAS 131242-39-2 (content HPLC>98% w, water<1% w) and then treated as described for Example 7. A strongly fused yarn was obtained.

Example 12

Two pieces of approx. 50 cm long and approx. 2 mm wide, spun Technora® T-240 220 dtex yarn (para-aramid copolymer) were covered over a length of 1 cm with the ionic liquid tributylmethylammonium acetate, CAS 131242-39-2 (content HPLC>98% w, water<1% w) and then treated as described for Example 7. A strongly fused yarn was obtained.

Example 13

Two pieces of approx. 50 cm long and approx. 2 mm wide, spun Technora® T-240 220 dtex, yarn were treated as described for Example 7. A strongly fused yarn was obtained.

Example 14

Two pieces of approx. 50 cm long and approx. 2 mm wide, spun Kevlar® K29 yarn (para-aramid) were covered over a length of 1 cm with the formulated ionic liquid 1-ethyl-3-methylimidazolium fluoride (CAS 133928-43-5)/DMSO 1:1 (purity ionic liquid HPLC>98% rel. area, water 13.1% w) and then treated as described for Example 7. A strongly fused yarn was obtained.

Example 15

Two pieces of approx. 50 cm long and approx. 2 mm wide, spun Kevlar® K29 yarn (para-aramid) were covered over a length of 1 cm with the formulated ionic liquid tetrabutylammonium fluoride hydrate (22206-57-1)/DMSO 1:1 (purity of ionic liquid HPLC>98% rel. area, water 5.2% w) and then treated as described for Example 7. A strongly fused yarn was obtained.

Example 16

Figure 2:
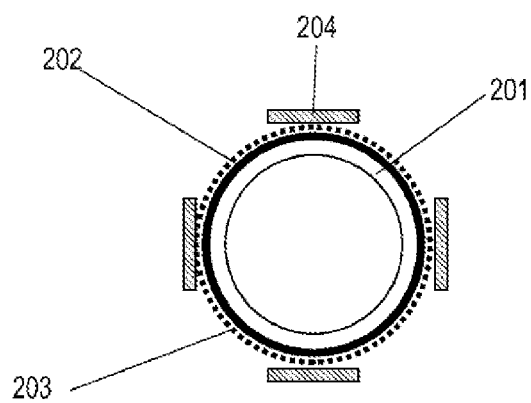
FIG. 2 shows a cross-section of a setup for manufacturing a cylindrical shaped article, wherein an aramid fabric 202 is arranged on a support body 201, which fabric is surrounded by a grid 203 and is fixed by means of clips 204.

An approx. 5 cm×3 cm piece of a fabric (m=0.573 g) made of an approx. 2 mm wide, spun Nomex® 1780 dtex yarn (meta-aramid) was coated by means of a standard 1 cm wide bristle brush with the ionic liquid 1-ethyl-3-methylimidazolium acetate (EMIM-OAc, CAS 143314-17-4; content HPLC>98% w, water<1% w) until soaked. Excessive EMIM-OAc was removed by swabbing with cellulose; renewed weighing determined the amount of the ionic liquid thus applied to be m=2.122 g. FIG. 2 shows how the fabric 202 thus treated was arranged on a shaping support body 201. The body was a glass pipe with a diameter of 15 mm that had been covered with a very thin layer of a commercial silicone oil release agent (Lauda Ultra 350). A grid 203 was arranged around the fabric 202. For this, an approx. 6 cm×6 cm piece of a commercial, mechanically rigid aluminum grid with a mesh of approx. 2 mm and a thickness of approx. 1 mm was bent into a cylindrical shape with one open side. The interior was covered with a very thin layer of silicone oil, then the grid 203 was pushed over the support body 201 with the Nomex® fabric 202. By attaching clips 204, as indicated in FIG. 2, pressure was applied to the mold, so that the cylinder of aluminum grid 203 decreased its diameter, was flushly pressed against the rigid glass pipe 201 and caused the pressure to be transmitted to the EMIM-OAc-treated Nomex® 1780 dtex fabric 202.

The setup thus prepared was then heated in a drying chamber for 2 hours at T=90° C., which turned the Nomex® fabric into a very viscous, gel-like mass. The mold was then treated for 10 minutes over boiling water with water vapor, so that the meta-aramid gelled in the ionic liquid started coagulating by absorbing water. The gel-like mass returned back into a solid of the same color as the original Nomex® fabric. The mold was then rinsed for 2 hours in water at 50° C. (beaker with magnetic stirrer) in order to remove any remaining ionic liquid EMIM-OAc. After removal of the metal clips 204 and of the aluminum grid 203, the fused aramid was obtained as an elastic, dimensionally stable, cylindrical hollow body, which showed the negative pattern of the aluminum grid on the outside and was smooth on the inside. This hollow body was then after-treated for 2 hours at 105° C. in the drying chamber. A hard, dimensionally stable hollow body of Nomex® 1780 dtex with a mass m=0.550 g was obtained.

Example 17

Figure 3:
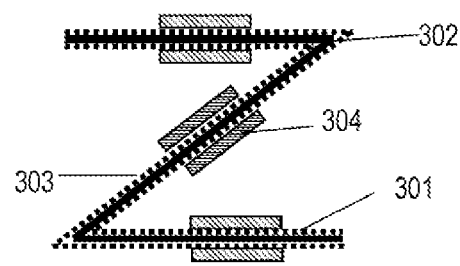
FIG. 3 shows a cross-section of a setup for manufacturing a three-dimensional shaped body, wherein an aramid fabric 302 is embedded between a first support grid 301 and a second support grid 303 and the setup is fixed by means of claims 304.

An approx. 3.5 cm×5 cm piece of a fabric (m=0.414 g) of an approx. 2 mm wide, spun Nomex® 1780 dtex yarn was coated by means of a standard 1 cm wide bristle brush with the ionic liquid 1-ethyl-3-methylimidazolium acetate (EMIM-OAc, CAS 143314-17-4; content HPLC>98% w, water<1% w) until soaked. Excessive EMIM-OAc was removed by swabbing with cellulose; renewed weighing determined the amount of the ionic liquid thus applied to be m=2.497 g. For forming a Z-shaped three-dimensional body, a setup as shown in FIG. 3 was prepared. The fabric 302 thus treated was put between a first support grid 301 and a second support grid 303. The support grids were two approx. 6 cm×6 cm pieces of a commercial, mechanically rigid aluminum grid with a mesh of approx. 2 mm and a thickness of approx. 1 mm, which had been covered with a very thin layer of the commercial silicone oil described in Example 16 as release agent. As shown in FIG. 3, the two aluminum grids 301 and 302 including the EMIM-OAc-treated Nomex® 1780 dtex fabric 301 were bent into a Z-shape and pressed together with metal clips 304 so that the pressure was transmitted to the Nomex® fabric.

The setup thus prepared was then heated in a drying chamber for 2 hours at T=90° C., which turned the Nomex® fabric into a very viscous, gel-like mass. The mold was then treated for 10 minutes over boiling water with water vapor, so that the meta-aramid gelled in the ionic liquid started coagulating by absorbing water and the gel-like mass returned back into a white solid of the same color as the original Nomex® fabric. The mold was then rinsed for 2 hours in water at 50° C. (beaker with magnetic stirrer) in order to remove any remaining ionic liquid EMIM-OAc. After removal of the metal clips and of the aluminum grid, an elastic, dimensionally stable, Z-shaped body was removed, which showed the negative pattern of the aluminum grid on the outsides. This shaped body was then after-treated for 2 hours at 105° C. in the drying chamber. A hard, dimensionally stable Z-shaped body of Nomex 1780 dtex with a mass m=0.397 g was obtained.

The invention claimed is:

1. A method for fusing aramid fibers comprising:
   a) treating a first area of an aramid fiber with an ionic liquid to form an at least partially dissolved aramid fiber area,
   wherein the aramid fiber includes meta-aramid fiber or para-aramid copolymer fiber and is not para-aramid fiber,
   wherein the ionic liquid meets at least one of the following two criteria:
      i) α value<0.6 and β value>0.8;
      ii) difference of β value minus α value≥0.45,
   wherein the α value and β value are Kamlet-Taft solvent parameters;
   b) contacting the at least partially dissolved aramid fiber area with another aramid fiber area; and
   c) thereafter causing or allowing the least partially dissolved aramid fiber area to become re-coagulated so as adhere the first area of the aramid fiber to the other aramid fiber area.

2. The method of claim 1, wherein the ionic liquid comprises a cation and an anion and wherein:
   the cation is selected from the group consisting of a quaternary ammonium, phosphonium, guanidinium, pyridinium, pyrimidinium, pyridazinium, pyrazinium, piperidinium, morpholinium, piperazinium, pyrrolium, pyrrolidinium, oxazolium, thiazolium, triazinium, imidazolium, triazolium, and protonated guanidinium, and
   the anion is selected from the group consisting of halides, carboxylates, carbonate, alkylcarbonates, hydroxide, alkoxides, aryloxides, phosphate, alkyl phosphates, and dialkyl phosphates.

3. The method of claim 2, wherein the anion is selected from the group consisting of:
   a halide selected from the group consisting of F—, Cl—, and Br—;
   a carboxylate having a general formula

   [$R_n$—COO]—                 (Vd), wherein $R_n$ is selected from the group consisting of hydrogen, $(C_{1-10})$alkyl, $(C_{3-10})$cycloalkyl, $(C_{2-10})$alkenyl, $(C_{3-10})$cycloalkenyl, aryl, heteroaryl, $(C_{1-8})$alkyl, $(C_{3-8})$cycloalkyl, $(C_{2-8})$alkenyl, $(C_{3-8})$cycloalkenyl, 5- to 6-membered aryl, and 5- to 6-membered heteroaryl;
   alkylcarbonate of the general formula

   [$R_s$—OCOO]—                (Vf), wherein $R_s$ is selected from the group consisting of $(C_{1-4})$alkyl, methyl carbonate, and ethyl carbonate;
   alkoxide or aryloxide of the general formula

   [$R_m$—O]—                (Ve), wherein $R_m$ is selected from the group consisting of $(C_{1-10})$alkyl, $(C_{3-10})$cycloalkyl, $(C_{2-10})$alkenyl, $(C_{3-10})$cycloalkenyl, aryl, heteroaryl, $(C_{1-8})$alkyl, $(C_{3-8})$cycloalkyl, $(C_{2-8})$alkenyl, $(C_{3-8})$cycloalkenyl, 5- to 6-membered aryl, and 5- to 6-membered heteroaryl;
   phosphate $PO_4^{3-}$;
   alkyl or dialkyl phosphate, or alkyl- and dialkyl phosphonate of the general formulas

   [$R_u$—OPO_3$]^{2-}$                (Vi),

   [$R_u$O—PO_2$—O$R_v$]^-$                (Vj),

   [$R_u$—PO_3$]^{2-}$                (Vk), or

   [$R_u$—PO_2$—O$R_v$]—$                (Vl), wherein $R_u$ and $R_v$ are independently selected from the group consisting of $(C_{1-10})$alkyl, $(C_{3-10})$cycloalkyl, $(C_{2-10})$alkenyl, $(C_{3-10})$cycloalkenyl, aryl, heteroaryl, $(C_{1-8})$alkyl, $(C_{3-8})$cycloalkyl, $(C_{2-8})$alkenyl, $(C_{3-8})$cycloalkenyl, 5- to 6-membered aryl, and 5- to 6-membered heteroaryl.

4. The method of claim 3, wherein the aramid fiber is para-aramid copolymer fiber.

5. The method of claim 3, wherein the aramid fiber is meta-aramid fiber.

6. The method of claim 2, wherein the anion is selected from the group consisting of:
   fluoride;
   hydroxide; and
   alkoxide or aryloxide of the general formula

   [$R_m$—O]—                (Ve), wherein $R_m$ is selected from the group consisting of $(C_{1-10})$alkyl, $(C_{3-10})$cycloalkyl, $(C_{2-10})$alkenyl, $(C_{3-10})$cycloalkenyl, aryl, or heteroaryl.

7. The method of claim 1, wherein the at least partially dissolved aramid fiber area is re-coagulated by:
   i) precipitating the aramid by adding an anti-solvent, or
   ii) removing the ionic liquid by heating to a temperature above the thermal decomposition point of the ionic liquid, but below the thermal decomposition point of the aramid, wherein the ionic liquid is removed in the form of gaseous decomposition products; or below its thermal decomposition point, as long as the coordinating ionic liquid has a vapor pressure sufficiently high to allow distilling it off optionally in vacuum, or
   iii) polymerizing the ionic liquid, or
   iv) a combination thereof.

8. The method of claim 1, wherein contacting the at least partially dissolved aramid fiber area with another aramid fiber area is performed while applying pressure to the contact area.

9. The method of claim 1, further comprising partially dissolving the other aramid fiber area with the ionic liquid.

10. The method of claim 1, wherein the ionic liquid is not 1-ethyl-3-methylimidazolium acetate.

11. A method for fusing aramid fibers comprising:
    a) treating at least one area of an aramid polymer fiber with an ionic liquid so that the aramid polymer is partially dissolved,
    wherein the ionic liquid meets at least one of the following two criteria:
       i) α value<0.6 and β value>0.8;
       ii) difference of β value minus α value≥0.45,
       wherein the α value and β value are Kamlet-Taft solvent parameters,
    wherein the ionic liquid is not 1-ethyl-3-methylimidazolium acetate;
    b) contacting the aramid fiber via the dissolved area with another aramid fiber area; and subsequently
    c) causing or allowing the partially dissolved area of the aramid polymer to become re-coagulated.

12. The method of claim 11, wherein the ionic liquid comprises a cation and an anion, and wherein:
the cation is selected from the group consisting of a quaternary ammonium, phosphonium, guanidinium, pyridinium, pyrimidinium, pyridazinium, pyrazinium, piperidinium, morpholinium, piperazinium, pyrrolium, pyrrolidinium, oxazolium, thiazolium, triazinium, imidazolium, triazolium, and protonated guanidinium, and
the anion is selected from the group consisting of halides, hydroxide, alkoxides, and aryloxides.

13. The method of claim 12, wherein the anion is selected from the group consisting of:
fluoride;
hydroxide; and
alkoxide or aryloxide of the general formula

$$[R_m\text{—}O]^-  \qquad (Ve),$$

wherein $R_m$ is selected from the group consisting of $(C_{1-10})$alkyl, $(C_{3-10})$cycloalkyl, $(C_{2-10})$alkenyl, $(C_{3-10})$cycloalkenyl, aryl, or heteroaryl.

14. The method of claim 11, wherein the partially dissolved area of the aramid polymer is re-coagulated by:
i) precipitating the aramid polymer by adding an anti-solvent, or
ii) removing the ionic liquid by heating to a temperature above the thermal decomposition point of the ionic liquid, but below the thermal decomposition point of the aramid polymer, wherein the ionic liquid is removed in the form of gaseous decomposition products; or below its thermal decomposition point, as long as the coordinating ionic liquid has a vapor pressure sufficiently high to allow distilling it off optionally in vacuum, or
iii) polymerizing the ionic liquid, or
iv) a combination thereof.

15. The method of claim 11, wherein contacting the aramid fiber via the dissolved area with another aramid fiber area is performed while applying pressure to the contact area.

16. The method of claim 11, further comprising partially dissolving the other aramid fiber area with the ionic liquid.

17. A method for fusing aramid fibers comprising:
a) treating at least one area of an aramid fiber with an ionic liquid so that the aramid is partially dissolved,
wherein the aramid fiber is meta-aramid fiber,
wherein the ionic liquid meets at least one of the following two criteria:
i) α value<0.6 and β value>0.8;
ii) difference of β value minus α value≥0.45,
wherein the α value and β value are Kamlet-Taft solvent parameters,
b) contacting the aramid fiber via the dissolved area with another aramid fiber area, and
c) thereafter causing or allowing the partially dissolved area of the aramid to become re-coagulated.

18. The method of claim 17, wherein the ionic liquid comprises a cation and an anion and wherein:
the cation is selected from the group consisting of a quaternary ammonium, phosphonium, guanidinium, pyridinium, pyrimidinium, pyridazinium, pyrazinium, piperidinium, morpholinium, piperazinium, pyrrolium, pyrrolidinium, oxazolium, thiazolium, triazinium, imidazolium, triazolium, and protonated guanidinium, and
the anion is selected from the group consisting of halides, carboxylates, carbonate, alkylcarbonates, hydroxide, alkoxides, aryloxides, phosphate, alkyl phosphates, and dialkyl phosphates.

19. The method of claim 17, wherein the partially dissolved area of the aramid polymer is re-coagulated by:
i) precipitating the aramid polymer by adding an anti-solvent, or
ii) removing the ionic liquid by heating to a temperature above the thermal decomposition point of the ionic liquid, but below the thermal decomposition point of the aramid polymer, wherein the ionic liquid is removed in the form of gaseous decomposition products; or below its thermal decomposition point, as long as the coordinating ionic liquid has a vapor pressure sufficiently high to allow distilling it off optionally in vacuum, or
iii) polymerizing the ionic liquid, or
iv) a combination thereof.

* * * * *

UNITED STATES PATENT AND TRADEMARK OFFICE
CERTIFICATE OF CORRECTION

PATENT NO. : 11,286,356 B2
APPLICATION NO. : 15/930509
DATED : March 29, 2022
INVENTOR(S) : Roland Kalb et al.

It is certified that error appears in the above-identified patent and that said Letters Patent is hereby corrected as shown below:

In the Specification

Column 19
Line 63, change "instable" to – unstable –

Column 25
Line 9, change "due their relatively" to – due to their relatively –

Column 29
Line 9, change "und" to – and –

Column 29
Line 55, change "spayed" to – sprayed –

Column 30
Line 16, change "between to two" to – between the two –

Signed and Sealed this
Ninth Day of August, 2022

Katherine Kelly Vidal
*Director of the United States Patent and Trademark Office*